(12) United States Patent
Kondo et al.

(10) Patent No.: US 7,440,029 B2
(45) Date of Patent: Oct. 21, 2008

(54) APPARATUS AND METHOD FOR PROCESSING INFORMATIONAL SIGNAL

(75) Inventors: Tetsujiro Kondo, Tokyo (JP); Nobuyuki Asakura, Tokyo (JP); Takeharu Nishikata, Saitama (JP); Koichi Fujishima, Saitama (JP)

(73) Assignee: Sony Corporation, Tokyo (JP)

( * ) Notice: Subject to any disclaimer, the term of this patent is extended or adjusted under 35 U.S.C. 154(b) by 675 days.

(21) Appl. No.: 10/969,955

(22) Filed: Oct. 22, 2004

(65) Prior Publication Data

US 2005/0140824 A1 Jun. 30, 2005

(30) Foreign Application Priority Data

Nov. 5, 2003 (JP) ............................. 2003-375934

(51) Int. Cl.
*H04N 11/20* (2006.01)
(52) U.S. Cl. ................... 348/441; 348/448; 348/452; 348/458
(58) Field of Classification Search ............. 348/441, 348/448, 449, 452, 458, 459, 674–677
See application file for complete search history.

(56) References Cited

U.S. PATENT DOCUMENTS 5,089,890 A * 2/1992 Takayama .................. 348/674
5,196,924 A * 3/1993 Lumelsky et al. ........... 348/674
2002/0019892 A1 2/2002 Kondo et al.

FOREIGN PATENT DOCUMENTS

| EP | 0 635 978 A1 | 1/1995 |
|---|---|---|
| EP | 1 501 295 A1 | 1/2005 |
| EP | 1 501 296 A1 | 1/2005 |
| JP | 9-83961 | 3/1997 |
| JP | 2000-102006 | 4/2000 |
| JP | 2001-309315 | 11/2001 |
| JP | 2002-237942 | 8/2002 |
| JP | 2003-303330 | 10/2003 |

* cited by examiner

*Primary Examiner*—M. Lee
(74) *Attorney, Agent, or Firm*—Oblon, Spivak, McClelland, Maier & Neustadt, P.C.

(57) ABSTRACT

Converting circuits convert the values of multiple items of SD pixel data (pixel value) as class tap data to luminance values. The converting circuits convert pixel values to luminance values based on a correspondence relation between a value of pixel data in an image display device and a luminance value. Class-detecting circuits detect a space class and a motion class based on plural luminance values. Class-synthesizing circuit acquires a class code indicating the class to which the pixel data of a target position in an HD signal belongs. Estimation/prediction-operating circuit obtains items of pixel data of the target position in the HD signal based on an estimation equation using data of an prediction tap and coefficient data of the class indicated by the class code. Consequently, appropriate classification of class to the luminance characteristic of a display device is performed.

14 Claims, 11 Drawing Sheets

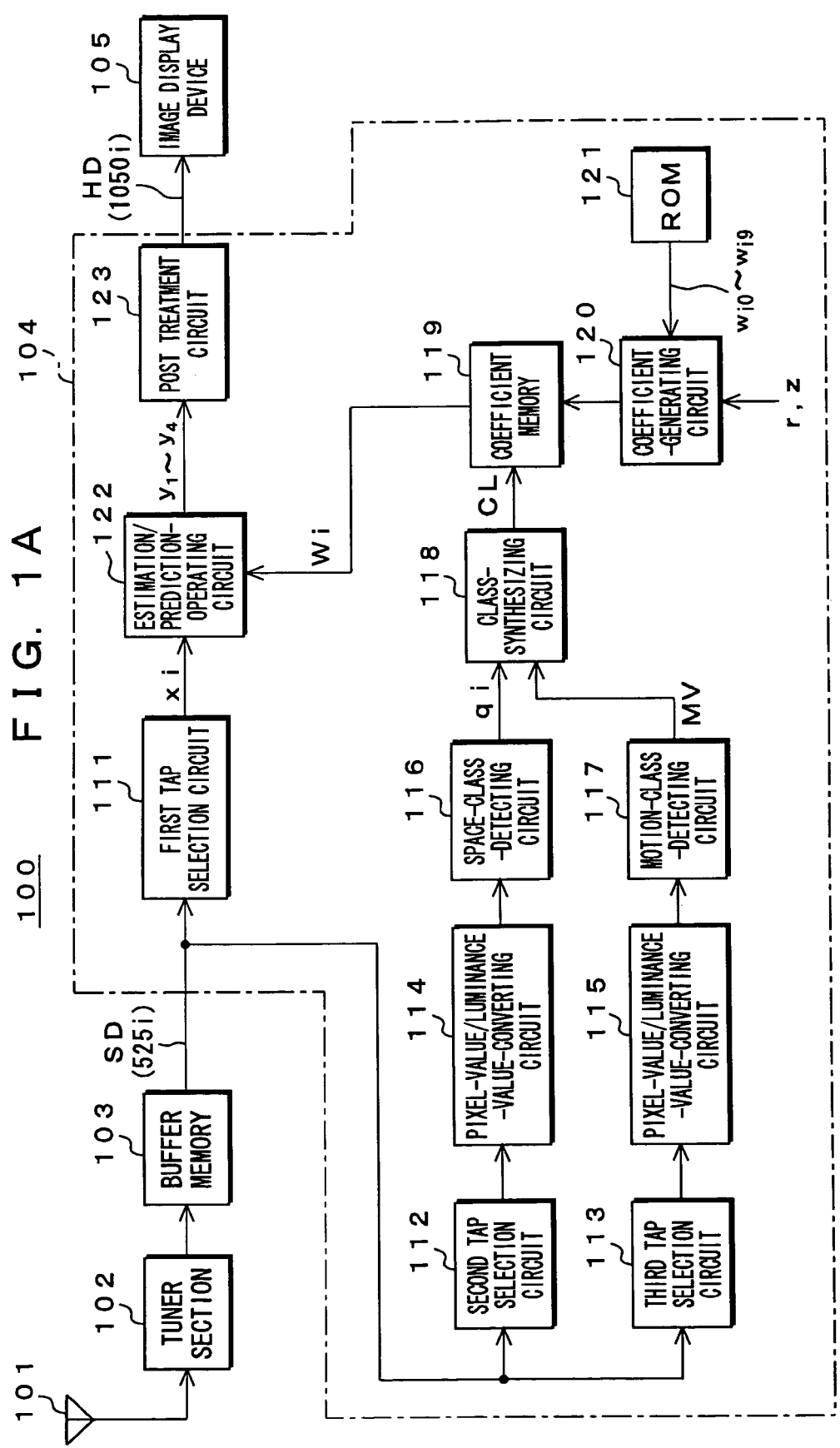

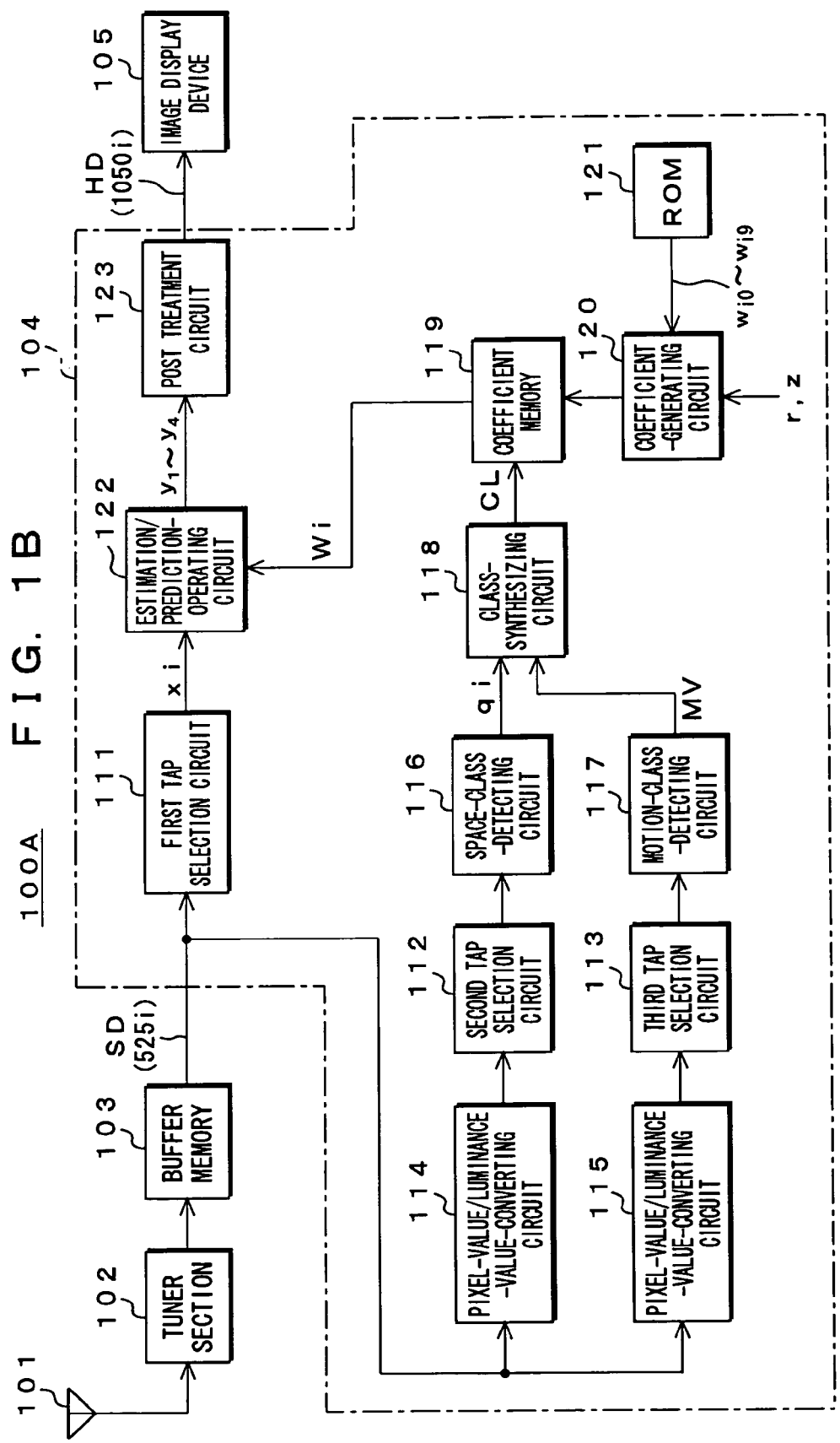

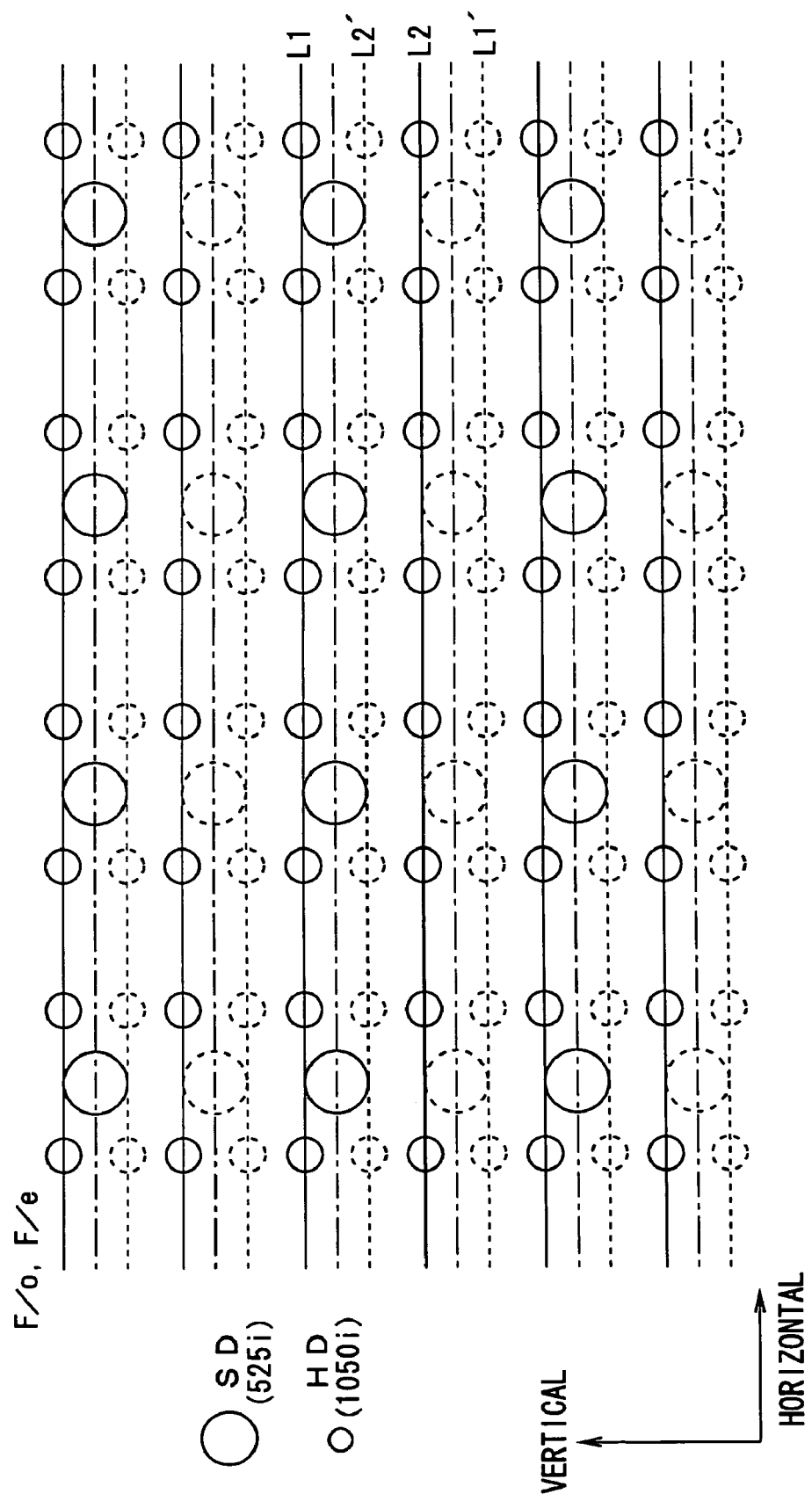

APPARATUS AND METHOD FOR PROCESSING INFORMATIONAL SIGNAL

BACKGROUND OF THE INVENTION

1. Field of the Invention

The present invention relates to an apparatus and a method for processing informational signal. More specifically, the present invention relates to an apparatus and a method for processing informational signal, which converts a first informational signal composed of multiple items of informational data to a second informational signal composed of multiple items of informational data, an apparatus and a method for generating coefficient seed data, which are used in the apparatus and the method for processing informational signal, a program for executing each of the methods, and a medium recording the program thereof.

2. Description of Related Art

Conventionally, a format conversion for converting, for example, a standard definition (SD) signal called as 525i signal to a high definition (HD) signal called as 1050i signal has been proposed. The 525i signal designates an interlace type image signal having 525 lines. The 1050i signal designates an interlace type image signal having 1050 lines.

To achieve the above-described format conversion, a resolution-creating method in which when obtaining pixel data of the 1050i signal from pixel data of the 525i signal, coefficient data of an estimation equation relative to a phase of each pixel of the 1050i signal corresponding to a pixel of the 525i signal is stored in a memory and the pixel data of the 1050i signal is obtained based on that estimation equation using this coefficient data has been proposed.

Japanese Patent Application Laid-Open No.2001-309315 has disclosed that when the image of the aforementioned 1050i signal is displayed on an image display device such as cathode ray tube (CRT) display, liquid crystal display (LCD), plasma display panel (PDP), the coefficient data corresponding to a kind of the image display device is used so as to obtain an image quality fitting to the image display device. For example, when the image display device is of the CRT display, the resolution of the image is set to a normal state. When the image display device is of the LCD, the resolution is set lower than the normal. When the image display device is of the PDP, the resolution is set higher than the normal.

Further, in an apparatus for converting the image signal disclosed in the Japanese Patent Application Laid-Open No.2001-309315, a class to which pixel data of a target position in that HD signal belongs is detected based on multiple items of pixel data of the SD signal located around the target position of the HD signal, thereby acquiring the pixel data of the target position in that HD signal using coefficient data corresponding to this class.

That is, in the apparatus for converting the image signal disclosed in the Japanese Patent Application Laid-Open No.2001-309315, the classification is executed in the same way regardless of the kinds of the image display devices so that classification inadequate to fit to an output characteristic of a used image display device is carried out. This prevents an HD signal adapting to the image display device from being obtained.

An object of the present invention is to make a second informational signal obtained from a conversion of a first informational signal adaptable to an output device for obtaining the output from the second informational signal.

SUMMARY OF THE INVENTION

According to the present invention, the foregoing object is attained by an apparatus for processing informational signal wherein first informational signal constituted of multiple items of informational data is converted to second informational signal constituted of multiple items of informational data. The apparatus comprises data-processing means for converting values of the multiple items of the informational data of the first informational signal located around a target position in the second informational signal based on correspondence relation between a value of informational data in output means for obtaining an output by the second informational signal and an output value to obtain plural output values. The apparatus also comprises class-detecting means for detecting a class to which the informational data of the target position in the second informational signal belongs based on the plural output values obtained by the data-processing means. The apparatus further comprises informational-data-generating means for generating the informational data of the target position in the second informational signal corresponding to the class detected by the class-detecting means.

In accordance with another aspect of the invention, an apparatus for processing informational signal wherein first informational signal composed of multiple items of informational data is converted to second informational signal composed of multiple items of informational data is provided. The apparatus comprises a data-processing unit configured to convert values of the multiple items of the informational data of the first informational signal located around a target position in the second informational signal based on correspondence relation between a value of informational data in an output unit for obtaining an output by the second informational signal and an output value to obtain plural output values. The apparatus also comprises a class-detecting unit configured to detect a class to which the informational data of the target position in the second informational signal belongs based on the plural output values obtained by the data-processing unit. The apparatus further comprises an informational-data-generating unit configured to generate informational data of the target position in the second informational signal corresponding to the class detected by the class-detecting unit.

In accordance with further aspect of the invention, a method for processing informational signal wherein first informational signal composed of multiple items of informational data is converted to second informational signal composed of multiple items of informational data is provided. The method comprises the step of converting values of the multiple items of informational data of the first informational signal located around a target position in the second informational signal based on correspondence relation between a value of informational data in an output means for obtaining an output by the second informational signal and an output value to obtain plural output values. The method also comprises the step of detecting a class to which the informational data of the target position in the second informational signal belongs based on the plural output values obtained by the above output-values-obtaining step. The method further comprises the step of generating the informational data of the target position in the second informational signal corresponding to the class detected by the above class-detecting step.

The program of the present invention is a program for making the computer execute the above-described informational-signal-processing method. Further, the computer readable medium of the present invention is a medium recording the above-described program.

According to the present invention, the first informational signal is converted to the second informational signal. The first and second informational signals are composed of multiple items of informational data. For example, the informational signal is an image signal composed of multiple items of pixel data or audio signal composed of multiple items of audio data (sampling data).

Values of plural informational data of the first informational signal located around the target position in the second informational signal are converted based on the correspondence relation between the value of informational data in the output means for obtaining the output by the second informational signal and the output value so as to obtain plural output values. For example, if the informational signal is an image signal, the correspondence relation between the value of informational data and the output value is a correspondence relation between the value of pixel data and a luminance value.

For example, if the informational signal is an image signal, the output means is an image display device, for example, CRT display, LCD, PDP or the like. For example, if the informational signal is an audio signal, the output means is an audio output device, for example, a speaker.

For example, multiple items of informational data located around the target position in the second informational signal are selected based on the first informational signal. Values of the selected multiple items of informational data are respectively converted to output values based on the correspondence relation between the value of informational data and the output value so as to obtain the above-mentioned plural output values.

Further, the value of each informational data constituting the first informational signal is converted to an output value based on the correspondence relation between the value of the informational data and the output value. Based on each output value obtained by this conversion, then, plural output values corresponding to the multiple items of informational data in the first informational signal located around the target position in the second informational signal are picked out selectively so as to obtain the above-mentioned plural output values.

Based on the plural output values obtained as described above, a class to which the informational data of the target position in the second informational signal belongs is detected. For example, the respective plural output values undergo data compression processing so as to generate a class code indicating a class. Corresponding to such a detected class, the informational data of the target position in the second informational signal is generated.

For example, coefficient data, which corresponds to the class, used for an estimation equation is generated. Multiple items of informational data located around the target position in the second informational signal are selected based on the first informational signal. Using these multiple items of informational data and the coefficient data, the informational data of the target position in the second informational signal is operated based on the estimation equation.

It is permissible to provide additionally with a parameter-inputting means for inputting a value of a parameter indicating quality of output by the second informational signal so as to generate coefficient data, which corresponds to a class and the value of the parameter, used for an estimation equation. Consequently, by changing the value of the parameter, the quality of the output by the second informational signal can be adjusted. In this case, the coefficient data corresponding to the class and the value of the parameter is generated based on the generation equation (the coefficient seed data is the coefficient data of this generation equation) including the parameter using the coefficient seed data corresponding to the class and the value of the parameter.

As described above, according to the present invention, values of the multiple items of informational data of the first informational signal located around the target position in the second informational signal are converted based on the correspondence relation between the value of the informational data in the output means for obtaining the output by the second informational signal and the output value so as to obtain plural output values. A class to which the informational data of the target position in the second informational signal belongs is detected based on the plural output values so as to generate the informational data of the target position in the second informational signal corresponding to this class. This allows appropriate classification for the output characteristic of the output means to be performed, thereby obtaining the second informational signal fitting to the output means.

In accordance with additional aspect of the present invention, provided is an apparatus for generating coefficient seed data that is coefficient data in a generation equation for generating coefficient data used for an estimation equation for use when converting first informational signal composed of multiple items of informational data to second informational signal composed of multiple items of informational data. The apparatus comprises parameter-inputting means for inputting a value of a parameter for specifying a quality of output a first learning signal corresponding to the first informational signal or a second learning signal corresponding to the second informational signal with the quality of output corresponding to a parameter contained in the generation equation. The apparatus also comprises data-processing means for converting values of the multiple items of informational data of the first learning signal located around a target position in the second learning signal based on correspondence relation between a value of informational data in output means for obtaining an output by the second informational signal and an output value to obtain plural output values. The apparatus further comprises class-detecting means for detecting a class to which the informational data of the target position in the second learning signal belongs based on the plural output values obtained by the data-processing means. The apparatus additionally comprises data-selecting means for selecting the multiple items of informational data located around the target position in the second learning signal based on the first learning signal. The apparatus still further comprises arithmetic operating means for operating and obtaining the coefficient seed data for each class using a class detected by the class-detecting means, the value of the parameter input by the parameter-inputting means, the multiple items of informational data selected by the data-selecting means, and the informational data of the target position in the second learning signal.

In accordance with still further aspect of the present invention, provided is an apparatus for generating coefficient seed data that is coefficient data in a generation equation for generating coefficient data used for an estimation equation for use when converting first informational signal composed of multiple items of informational data to second informational signal composed of multiple items of informational data. The apparatus comprises a parameter-inputting unit configured to input a value of a parameter for specifying a quality of output by a first learning signal corresponding to the first informational signal or a second learning signal corresponding to the second informational signal with the quality of output corresponding to a parameter contained in the generation equation. The apparatus also comprises a data-processing unit configured to convert values of the multiple items of informational data of the first learning signal located around a target position in the second learning signal based on correspondence relation between a value of informational data in an output unit for obtaining an output by the second informational signal and an output value to obtain plural output values. The apparatus further comprises a class-detecting unit configured to detect a class to which the informational data of the target position in the second learning signal belongs based on the plural output values obtained by the data-processing unit. The apparatus additionally comprises a data-selecting unit configured to select the multiple items of informational data located around the target position in the second learning signal based on the first learning signal. The apparatus still further comprises an arithmetic operating unit configured to operate and obtain the coefficient seed data for each class using a class detected by the class-detecting unit, the value of the parameter input by the parameter-inputting unit, the multiple items of informational data selected by the data-selecting unit, and the informational data of the target position in the second learning signal.

In accordance with still further aspect of the present invention, provided is a method for generating coefficient seed data that is coefficient data in a generation equation for generating coefficient data used for an estimation equation for use when converting first informational signal composed of multiple items of informational data to second informational signal composed of multiple items of informational data. The method comprises the step of inputting a value of a parameter for specifying a quality of output by a first learning signal corresponding to the first informational signal and a second learning signal corresponding to the second informational signal with the quality of output corresponding to a parameter contained in the generation equation. The method also comprises the step of converting values of the multiple items of informational data of the first learning signal located around a target position in the second learning signal based on correspondence relation between a value of informational data in an output means for obtaining an output by the second informational signal and an output value to obtain plural output values. The method further comprises the step of detecting a class to which the informational data of the target position in the second learning signal belongs based on the multiple items of output values obtained by the above output-values-obtaining step. The method additionally comprises the step of selecting the multiple items of informational data located around the target position in the second learning signal based on the first learning signal. The method still further comprises the step of operating and obtaining the coefficient seed data for each class using a class detected by the class-detecting step, the value of the parameter input in the parameter-value-inputting step, the multiple items of informational data selected in the data-selecting step, and the informational data of the target position in the second learning signal.

The program of the present invention is a program for allowing a computer to execute the above-described method for generating coefficient seed data. The computer readable medium of the present invention is a medium recording the above-described program.

According to the present invention, the coefficient seed data that is coefficient data in the generation equation for generating coefficient data is generated. The latter coefficient data is used for the estimation equation used when converting the first informational signal composed of multiple items of informational data to the second informational signal composed of multiple items of informational data. The generation equation for generating the coefficient data includes a parameter. Corresponding to this parameter, the value of the parameter for specifying the quality of output by the first learning signal corresponding to the first informational signal or the second learning signal corresponding to the second informational signal is input.

Values of the multiple items of informational data of the first learning signal located around the target position in the second learning signal are converted based on the correspondence relation between the value of the informational data in the output means for obtaining output by the second learning signal and the output value so as to obtain plural output values. Based on the plural output values, the class to which the informational data of the target position in the second informational signal belongs is detected.

Multiple items of informational data located around the target position in the second learning signal are selected based on the first learning signal. The values of input parameters are changed step by step, so that the coefficient seed data is acquired for each class using the class to which the informational data of the target position in the second learning signal belongs, the value of the parameter, the selected multiple items of informational data, and the informational data of the target position in the second learning signal.

As described above, according to the present invention, values of the multiple items of informational data of the first learning signal located around the target position in the second learning signal are converted based on the correspondence relation between the value of the informational data in the output means for obtaining output by the second informational signal and the output value so as to obtain plural output values. Based on the plural output values, the class to which the informational data of the target position in the second learning signal belongs is detected so as to obtain the coefficient seed data for each class. This allows to be obtained the coefficient seed data for well use in the above-described informational-signal-processing apparatus.

The concluding portion of this specification particularly points out and directly claims the subject matter of the present invention. However those skill in the art will best understand both the organization and method of operation of the invention, together with further advantages and objects thereof, by reading the remaining portions of the specification in view of the accompanying drawing(s) wherein like reference characters refer to like elements.

BRIEF DESCRIPTION OF THE DRAWINGS

FIG. 1A is a block diagram showing a configuration of a TV receiver according to an embodiment of the present invention;

FIG. 1B is a block diagram showing a configuration of a TV receiver according to another embodiment of the present invention;

FIG. 2 is a diagram showing the relation in pixel position between the 525i signal and 1050i signal;

DETAILED DESCRIPTION OF THE PREFERRED EMBODIMENTS

Figures 3A, 3B:
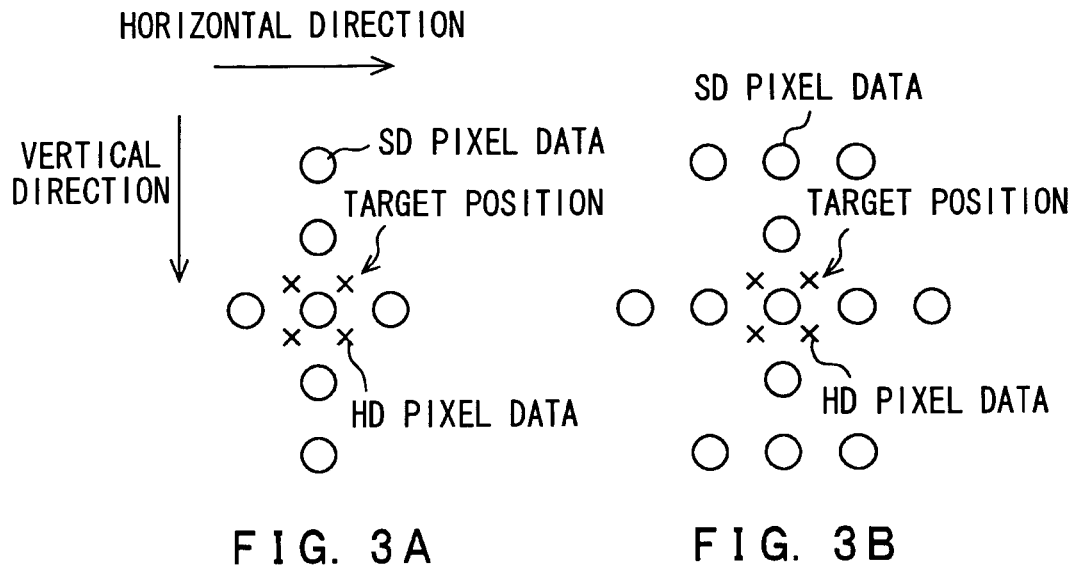
FIGS. 3A, 3B are a diagram showing an example of class tap and prediction tap.

Hereinafter, the preferred embodiments of the present invention will be described in detail with reference to the accompanying drawings. FIG. 1A shows a configuration of a TV receiver 100 according to an embodiment of the present invention. FIG. 1B shows a configuration of a TV receiver 100A according to another embodiment of the present invention.

This TV receiver 100 has a function of obtaining a standard definition (SD) signal called as 525i signal from a broadcasting signal, converting this 525i signal to a high definition (HD) signal called as 1050i signal, and displaying an image composed of this HD signal. The 525i signal mentioned here is an interlace type image signal having 525 lines. The 1050i signal mentioned here is an interlace type image signal having 1050 lines.

FIG. 2 shows the relation in pixel position of a frame (F) in which the 525i signal and 1050i signal exist, while the pixel position of an odd (o) field is indicated with a solid line and the pixel position of an even (e) field is indicated with dotted line. A large dot indicates a pixel of the 525i signal and a small dot indicates a pixel of the 1050i signal. As shown in FIG. 2, as the pixel data of the 1050i signal, line data L1, L1' near the line of the 525i signal and line data L2, L2' far from the line of the 525i signal is present. The data L1, L2 is line data of an odd field and the data L1', L2' is line data of an even field. Further, the number of pixels in each line of the 1050i signal is double that of the pixels in each line of the 525i signal.

Returning to FIG. 1A, the TV receiver 100 comprises a signal-receiving antenna 101, a tuner section 102 for receiving a broadcasting signal (RF modulation signal) from this signal-receiving antenna 101 and undergoing tuning processing, intermediate frequency amplification processing, wave detection processing and the like, thereby obtaining an SD signal, and a buffer memory 103 for storing the SD signals obtained by this tuner section 102 temporarily.

The TV receiver 100 comprises an image-signal-processing section 104 for converting an SD signal stored in the buffer memory 103 temporarily to an HD signal, and an image display device 105 for displaying an image of the HD signal obtained by this image-signal-processing section 104 as an output means. This image display device 105 is constituted of, for example, a CRT display, LCD, PDP or the like. This image display device 105 constitutes an output with the HD signal, namely, output means for obtaining an image.

The following will describe the operations of the TV receiver 100 shown in FIG. 1A. An SD signal obtained in the tuner section 102 is supplied to a buffer memory 103 where it is stored temporarily. The SD signal stored temporarily in this buffer memory 103 is then supplied to an image-signal-processing section 104 where it is converted to an HD signal. That is, in the image-signal-processing section 104, pixel data constituting the HD signal (hereinafter referred to as HD pixel data) is generated from pixel data constituting the SD signal (hereinafter referred to as SD pixel data).

The HD signal output from this image-signal-processing section 104 is supplied to the image display device 105 where an image of the HD signal is displayed on a screen of this image display device 105.

The following will describe the image-signal-processing section 104 in detail. This image-signal-processing section 104 includes first-third tap selection circuits 111-113 each for picking up multiple items of SD pixel data selectively located around a target position in the HD signal (1050i signal) based on the SD signal (525i signal) stored temporarily in the buffer memory 103 and outputting it.

The first tap selection circuit 111 picks up multiple items of SD pixel data xi (i=1-n) used for prediction selectively as data of prediction tap. The second tap selection circuit 112 picks up multiple items of SD pixel data used for performing classification of class corresponding to a level distribution pattern of the SD pixel data selectively as the data of spatial class tap. FIGS. 3A, 3B respectively show examples of the spatial class tap and the prediction tap.

The third tap selection circuit 113 picks up multiple items of SD pixels used for performing classification of class corresponding to a motion selectively as data of a motion class tap. In the meantime, if the spatial class is determined using the SD pixel data belonging to plural fields, this spatial class contains motion information.

The image-signal-processing section 104 has pixel-value/luminance-value-converting circuits 114, 115. This converting circuit 114 converts values of the multiple items of SD pixel data (pixel values) picked up selectively as data of the spatial class tap by the second tap selection circuit 112 to luminance values, respectively, based on the correspondence relation between value of pixel data in the image display device 105 and luminance value as an output value. This converting circuit 114 constitutes data-processing means for acquiring plural luminance values each used for spatial class detection with the second tap selection circuit 112.

Likewise, the converting circuit 115 converts values of the multiple items of SD pixel data (pixel values) picked up selectively as data of the motion class tap by the third tap selection circuit 113 to luminance values, respectively, based on the correspondence relation between value of pixel data in the image display device 105 and luminance value as an output value. This converting circuit 115 constitutes data-processing means for acquiring plural luminance values each used for motion class detection with the third tap selection circuit 113.

Figure 4:
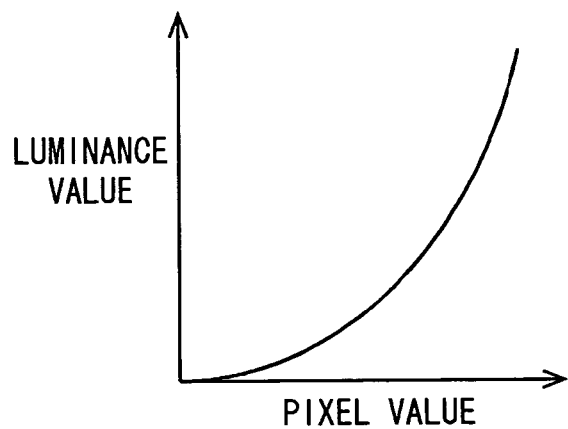
FIG. 4 is a diagram showing the correspondence relation between a pixel value and a luminance value.

In the meantime, in the image display device 105, generally, the luminance value is not in linear relationship with the pixel value and has the correspondence relation shown in FIG. 4 and according to the following equation (1):

$$y = A(x/255)^\gamma \quad (1)$$

According to the equation (1), a term, "y", indicates a luminance value, a term, "x" indicates a pixel value, a term, "A" indicates a maximum luminance value, and a term, "γ" indicates a gamma value. Although the detail description is omitted, it is well known that the gamma value γ differs depending on the type of the image display device 105, for example, CRT display, LCD, PDP or the like.

Each of the converting circuits 114, 115 computes a luminance value from the pixel value according to the above-described equation (1) or obtains the luminance value from the pixel value using a table indicating the correspondence relation between pixel value and luminance value. For example, these converting circuits 114, 115 are capable of changing this table. Consequently, even when the type of the image display device 105 is changed, the present invention can cope with that situation easily.

Note that as the TV receiver 100A shown in FIG. 1B, the second tap selection circuit 112 and the pixel-value/luminance-value-converting circuit 114 may be arranged so that they are changed to each other. Similarly, the third tap selection circuit 113 and the pixel-value/luminance-value-converting circuit 115 may be arranged so that they are changed to each other.

In the converted case, the converting circuit 114 converts value of each of the multiple items of SD pixel data of the SD signal that has temporarily stored in the buffer memory 103 to a luminance value based on the correspondence relation between the value of the pixel data in the image display device 105 and the luminance value as the output value.

The second tap selection circuit 112 selects as spatial class tap data and picks out the converted plural luminance values that are used for classification of class corresponding to a level distribution pattern of the converted luminance values.

Similarly, the converting circuit 115 converts value of each of the multiple items of SD pixel data of the SD signal that has temporarily stored in the buffer memory 103 to a luminance value based on the correspondence relation between the value of the pixel data in the image display device 105 and the luminance value as the output value.

The third tap selection circuit 113 selects as motion class tap data and picks out the converted plural luminance values that are used for classification of class corresponding to motion. Other configuration of this embodiment shown in FIG. 1B likes those of the embodiment shown in FIG. 1A, a description of which will be deleted.

Further, the image-signal-processing section 104 includes a space-class-detecting circuit 116 for detecting a level distribution pattern of plural luminance values corresponding to data of the spatial class tap obtained in the converting circuit 114, detecting a spatial class based on this level distribution pattern and outputting the class information.

In the space-class-detecting circuit 116, a computation for compressing each luminance value into 8-bit data to 2-bit data is carried out. Then, compression data corresponding to each luminance value is output from the space-class-detecting circuit 116 as class information of the spatial class. According to this embodiment, data compression is carried out according to adaptive dynamic range coding (ADRC). As the data compression means, it is permissible to use differential pulse code modulation (DPCM), vector quantization (VQ) or the like as well as the ADRC.

Although originally, the ADRC has been an adaptive requantization method developed for high performance coding for video tape recorder (VTR), it is preferably adaptable to the above-described data compression because a local pattern of signal level can be expressed effectively with a short word length. When using the ADRC, if it is assumed that the maximum value of plural luminance values is MAX, its minimum value is MIN, the dynamic range of the plural luminance values is DR (=MAX−MIN+1) and requatization bit number is P, a requantization code qi is obtained as compressed data for each luminance value ki according to computation based on the following equation (2):

$$qi=[(ki-\text{MIN}+0.5)*2P/DR] \quad (2)$$

where [ ] means round-off processing in the equation (2). When there are Na luminance values, it set so that i=1~Na.

The image-signal-processing section 104 includes a motion-class-detecting circuit 117 for detecting a motion class for indicating the degree of the motion based on plural luminance values each corresponding to data of the motion class tap obtained in a modulating circuit 115 and outputting its class information.

In this motion-class-detecting circuit 117, a frame differential is computed from plural luminance values mi', ni' each corresponding to the multiple items of SD pixel data mi, ni picked out by the third tap selection circuit 113. An average of the absolute value of that differential then undergoes threshold value processing so as to detect a motion class that is an index of the motion. That is, the motion-class-detecting circuit 117 computes an average AV of the absolute value of the differential according to the following equation (3):

$$AV = \frac{\sum_{i=1}^{Nb} |mi' - ni'|}{Nb} \quad (3)$$

In the third tap selection circuit 113, if 12 items of SD pixel data m1-m6, n1-n6, for example, are picked out, Nb in the equation (3) is 6. Then, in the motion-class-detecting circuit 117, the average AV computed in the above-described way is compared with one or plural threshold value(s) so as to acquire the class information MV of the motion class. For example, if three threshold values th1, th2, th3 (th1<th2<th3) are prepared in order to detect four motion classes, when AV≦th1, MV=0; when th1<AV≦th2, MV=1; when th2<AV≦th3, MV =2; and when th3<AV, MV=3.

The image-signal-processing section 104 has a class-synthesizing circuit 118. This class-synthesizing circuit 118 obtains a class code CL indicating a class to which the pixel data (HD pixel data to be created) of a target position in the HD signal belongs, based on the requantization code qi as class information of spatial class received from the space-class-detecting circuit 116 and the class information MV of motion class received from the motion-class-detecting circuit 117. In this class-synthesizing circuit 118, a class code CL is computed according to the following equation (4):

$$CL = \sum_{i=1}^{Na} qi(2^P)^{i-1} + MV \cdot (2^P)^{Na} \quad (4)$$

where Na indicates the number of multiple items of SD pixel data as data of the spatial class tap and P indicates requantization bit number in the ADRC.

The image-signal-processing section 104 has a coefficient memory 119. This coefficient memory 119 stores coefficient data Wi (i=1–n) used for an estimation equation used in an estimation/prediction-operating circuit 122, which will be described later, for each class. This coefficient data Wi is used as information for converting the SD signal (525i signal) to the HD signal (1050i signal).

When the 525i signal is converted to the 1050i signal as described above, it is necessary to obtain four pixels of the 1050i signal corresponding to a pixel of the 525i signal in each of the odd and even fields. In this case, each of the four pixels in a unit pixel block of 2×2 that constitutes the 1050i signal in each of the odd and even fields has a different deviation in phase to the central prediction tap.

Figure 5:
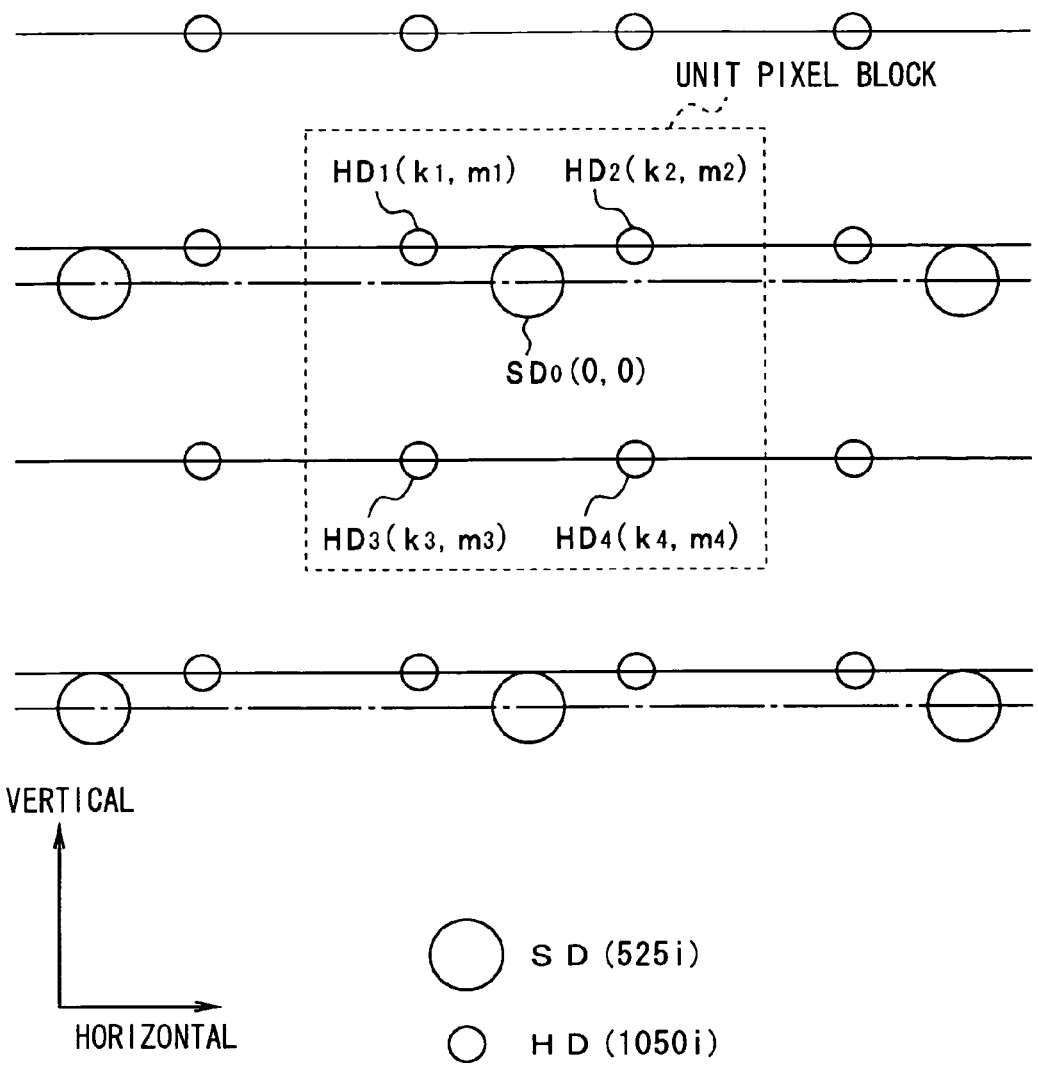
FIG. 5 is a diagram showing a deviation in phase (odd field) of the HD signal (1050i signal) from the central prediction tap of four pixels in a unit pixel block.

FIG. 5 shows a deviation in phase of each of the four pixels HD1-HD4 in the unit pixel block of 2×2, which constitutes the 1050i signal in the odd field, from the central prediction tap SD0. Here, the position of each of the HD1-HD4 deviates by k1-k4 in the horizontal direction and by m1-m4 in the vertical direction from the position of the SD0.

Figure 6:
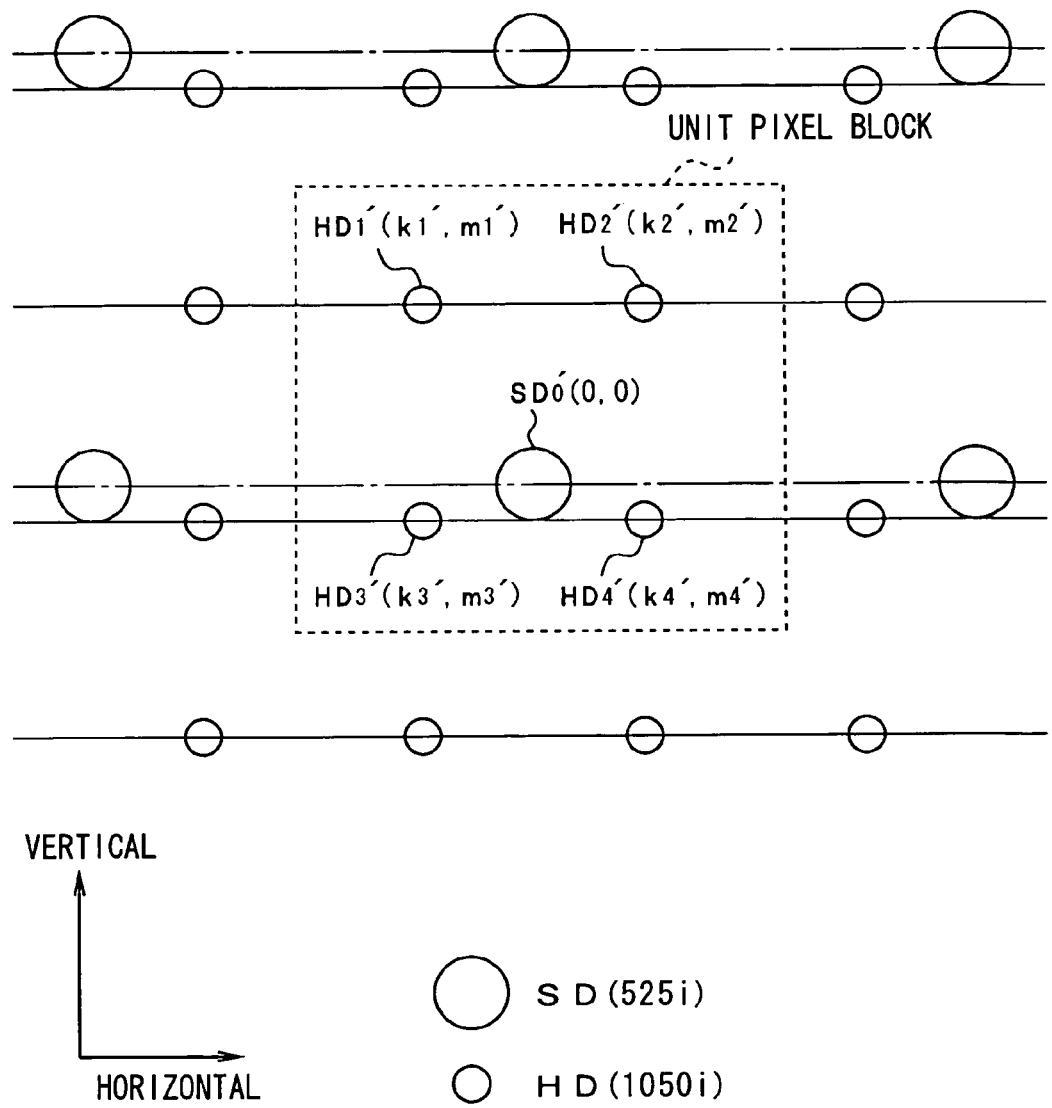
FIG. 6 is a diagram showing a deviation in phase (even field) of the HD signal (1050i signal) from the central prediction tap of four pixels in a unit pixel block.

FIG. 6 shows the deviation in phase of each of the four pixels HD1'-HD4' in the unit pixel block of 2×2, which constitutes the 1050i signal in the even field, from the central prediction tap SD0'. The position of each of the HD1'-HD4' deviates by k1'-k4' in the horizontal direction and by m1'-m4' in the vertical direction from the position of the SD0'.

For that purpose, the coefficient memory 119 stores coefficient data Wi for each combination of the class and the output pixels (HD1-HD4, HD1'-HD4').

This coefficient memory 119 receives the class code CL obtained in the class-synthesizing circuit 118 as read-out address information, reads out the coefficient data Wi of a class corresponding to the class code CL and supplies the coefficient data Wi to the estimation/prediction-operating circuit 122.

The image-signal-processing section 104 comprises a read only memory (ROM) 121 and a coefficient-generating circuit 120. The coefficient-generating circuit 120 generates the coefficient data Wi for each combination of the class and the output pixels (see HD1-HD4 in FIG. 5 and HD1'-HD4' in FIG. 6) based on a generation equation including parameters r, z in the following equation (5):

$$W_i = w_{i0} + w_{i1}r + w_{i2}z + w_{i3}r^2 + w_{i4}rz + w_{i5}z^2 + w_{i6}r^3 + w_{i7}r^2z + w_{i8}rz^2 + w_{i9}z^3 \quad (5)$$

where the parameter r is a parameter for determining resolution and the parameter z is a parameter for determining a noise removal degree.

ROM 121 stores coefficient seed data wi0-wi9, which are coefficient data in this generation equation, for each combination of the classes and output pixels. The generation method of this coefficient seed data will be described later. This ROM 121 loads coefficient seed data wi0-wi9 into the coefficient-generating circuit 120 and further, a user supplies the circuit 120 with the parameters r, z adjusted by himself or herself.

The coefficient data Wi (i=1–n) generated by this coefficient-generating circuit 120 is supplied to the above-described coefficient memory 119 where it is stored therein. The generation of the coefficient data Wi in this coefficient-generating circuit 120 is carried out, for example, in each vertical blanking period. Consequently, user's operation enables the coefficient data Wi of each class stored in the coefficient memory 119 to be changed at once to a value corresponding to each of the values of the parameters r, z even when the values of the parameters r, z are changed according to user's operation, so that the user may perform adjustment in resolution and noise removal degree smoothly.

The image-signal-processing section 104 has the estimation/prediction-operating circuit 122. This estimation/prediction-operating circuit 122 receives the data xi of prediction tap (multiple items of SD pixel data) picked out selectively by the first tap selection circuit 111 and the coefficient data Wi read out of the coefficient memory 119. From the data, xi and Wi, the estimation/prediction-operating circuit 122 obtains pixel data of an HD signal to be created (pixel data of a target position) based on the following equation (6):

$$y = \sum_{i=1}^{n} Wi \cdot xi \quad (6)$$

As described above, when the SD signal is converted to the HD signal, it is necessary to obtain four output pixels (HD1-HD4 or HD1'-HD4') of the HD signal to a pixel of the SD signal. This estimation/prediction-operating circuit 122 obtains pixel data for each unit pixel block of 2×2, which constitutes the HD signal.

Thus, the data xi of an prediction tap corresponding to four pixels (pixels of target position) in the unit pixel block is supplied from the first tap selection circuit 111 to this estimation/prediction-operating circuit 122. The coefficient data Wi corresponding to four pixels, which constitute the unit pixel block, is also supplied from the coefficient memory 119 to the estimation/prediction-operating circuit 122. This estimation/prediction-operating circuit 122 computes items of data y1-y4 of four pixels, which constitute the unit pixel block, individually according to the estimation equation (6).

The image-signal-processing section 104 includes a post treatment circuit 123 for performing linear sequential on the items of data y1-y4 of four pixels within the unit pixel block, which are output successively from the estimation/prediction-operating circuit 122, and outputting them in the format of the 1050i signal.

Next, the following will describe the operations of the image-signal-processing section 104 shown in FIG. 1A. In the second tap selection circuit 112, multiple items of SD pixel data located around the four pixels (pixels of target position) within the unit pixel block, which constitute an HD signal (1050i signal) to be created, are picked up selectively as data of spatial class tap based on the SD signal (525i signal) stored in the buffer memory 103 temporarily. The multiple items of SD pixel data are supplied to the pixel-value/luminance-value-converting circuit 114.

In the converting circuit 114, the values (pixel values) of the multiple items of SD pixel data are converted to luminance values based on the correspondence relation between the value of pixel data in the image display device 105 and the luminance value. The plural luminance values thus obtained by this conversion are supplied to the space-class-detecting circuit 116. In the space-class-detecting circuit 116, each luminance value corresponding to data of the spatial class tap undergoes the ADRC processing, so that the requantization code qi is obtained as the class information (mainly classification of class for expressing the waveform in the space) of the spatial class (see equation (2)).

Further, in the third tap selection circuit 113, multiple items of SD pixel data located around the four pixels (pixels of target position) within the unit pixel block, which constitute an HD signal (1050i signal) to be created, are picked out selectively as data of the motion class tap based on the SD signal (525i signal) stored in the buffer memory 103 temporarily. The multiple items of SD pixel data are supplied to the pixel-value/luminance-value-converting circuit 115.

In the converting circuit 115, the values (pixel values) of the multiple items of SD pixel data are converted to luminance values based on the correspondence relation between the value of the pixel data in the image display device 105 and the luminance value. The plural luminance values thus obtained by this conversion are supplied to the motion-class-detecting circuit 117. In the motion-class-detecting circuit 117, the class information MV of the motion class (mainly classification of class expressing a degree of the motion) is obtained from the plural luminance values corresponding to data of the motion class tap.

This motion information MV and the requantization code qi are supplied to the class-synthesizing circuit 118. In this class-synthesizing circuit 118, class code CL indicating a class to which the four pixels within the unit pixel block (pixels of target position) belongs is obtained for each unit pixel block that constitutes the HD signal (1050i signal) to be created from the motion information MV and the requantization code qi (see the equation (4)). This class code CL is supplied to the coefficient memory 119 as read-out address information.

The coefficient memory 119 receives and stores the coefficient data Wi for each combination of the classes and the output pixels (HD1-HD4, HD1'-HD4'), which correspond to the value of each of the parameters r, z, adjusted by a user, and a regenerated by the coefficient-generating circuit 120 in, for example, each vertical blanking period.

When the class code CL is supplied to the coefficient memory 119 as the read-out address information as described above, the coefficient data Wi of four output pixels (HD1-HD4 in the odd field and HD1'-HD4' in the even field) of a class corresponding to the class code CL is read out of this coefficient memory 119 and supplied to the estimation/prediction-operating circuit 122.

In the first tap selection circuit 111, the multiple items of SD pixel data located around the four pixels (pixels of target position) within the unit pixel block, which constitute an HD signal to be created, are picked up selectively as the data xi of an prediction tap based on the SD signal. The data xi of this prediction tap is supplied to the estimation/prediction-operating circuit 122.

In the estimation/prediction-operating circuit 122, items of the data y1-y4 of the four pixels (pixels of target position) within the unit pixel block, which constitute the HD signal to be created, are computed individually based on the estimation equation (6) using the data xi of the prediction tap and the coefficient data Wi of the four output pixel supplied from the coefficient memory 119. Then, the items of data y1-y4 output successively from the estimation/prediction-operating circuit 122 are supplied to the post treatment circuit 123.

After that, the post treatment circuit 123 performs the linear sequential on the items of data y1-y4 supplied successively from the estimation/prediction-operating circuit 122 and output them in the format of the 1050i signal. That is, the 1050i signal is output from the post treatment circuit 123 as the HD signal.

As described above, in the image-signal-processing section 104 shown in FIG. 1A, the values of the multiple items of pixel data of the SD signal located around a target position in the HD signal are converted based on the correspondence relation between the value (pixel value) of pixel data in the image display device 105 for obtaining an image based on the HD signal and luminance value so as to acquire plural luminance values. The class to which the pixel data of the target position in the HD signal belongs is detected based on the plural luminance values and then, informational data of the target position in the HD signal is generated corresponding to this class. Therefore, in this image-signal-processing section 104, appropriate classification of class fitting to the output luminance characteristic of the image display device 105 is carried out, so that an HD signal fitting to the image display device 105 can be obtained.

Next, the following will describe generating method for the coefficient seed data wi0-wi9 (i=1-n) of each class, which is scheduled to be stored in the ROM 121.

For a following description, tj (j=0-9) is defined as indicated in the following equation (7):

$$t0=1, t1=r, t2=z, t3=r2, t4=rz, t5=z2, t6=r3, t7=r2z,$$
$$t8=rz2, t9=z3 \quad (7)$$

By using this equation (7), the equation (5) is rewritten into the following equation (8):

$$Wi = \sum_{j=0}^{9} W_{ij} t_j \quad (8)$$

Finally, an unspecified coefficient wij is obtained by learning. That is, each time when combining classes and output pixels, a coefficient value which minimizes a square error is determined using the multiple items of SD pixel data and HD pixel data. This is a solution method based on so-called least square method. If it is assumed that the number of learning is m, the residue in learning data of k-th ($1 \leq k \leq m$) is ek and the sum of the square error is E, E is expressed, by using the equations (5), (6), in the form of the following equation (9):

$$E = \sum_{k=1}^{m} e_k^2 \quad (9)$$
$$= \sum_{k=1}^{m} [y_k - (W_1 x_{1k} + W_2 x_{2k} + \ldots + W_n x_{nk})]^2$$
$$= \sum_{k=1}^{m} \{y_k - [(t_0 w_{10} + t_1 w_{11} + \ldots + t_9 w_{19}) x_{1k} + \ldots +$$
$$(t_0 w_{n0} + t_1 w_{n1} + \ldots + t_9 w_{n9}) x_{nk}]\}^2$$
$$= \sum_{k=1}^{m} \{y_k - [(w_{10} + w_{11} r + \ldots + w_{19} z^3) x_{1k} + \ldots +$$
$$(w_{n0} + w_{n1} r + \ldots + w_{n9} z^3) x_{nk}]\}^2$$

where a term, xik indicates pixel data of k-th at an prediction tap position of i-th of the SD image and a term, yk indicates corresponding pixel data of an HD image of k-th.

According to the solution method based on the least square method, wij is obtained so that the partial differential with wij in the equation (9) is 0. This is indicated by the following equation (10):

$$\frac{\partial E}{\partial w_{ij}} = \sum_{k=1}^{m} 2\left(\frac{\partial e_k}{\partial w_{ij}}\right) e_k = -\sum_{k=1}^{m} 2 t_j x_{ik} e_k = 0 \quad (10)$$

If Xipjq and Yip are defined as indicated in the following equations (11), (12), the equation (10) is rewritten using a matrix as indicated in the following equation (13):

$$X_{ip,jq} = \sum_{k=1}^{m} x_{ik} \, t_p \, x_{jk} \, t_q \qquad (11)$$

$$Y_{ip} = \sum_{k=1}^{m} x_{ik} \, t_p \, y_k \qquad (12)$$

$$\begin{bmatrix} x1010 & x1011 & x1012 & \ldots & x1019 & x1020 & \ldots & x10n9 \\ x1110 & x1111 & x1112 & \ldots & x1119 & x1120 & \ldots & x11n9 \\ x1210 & x1211 & x1212 & \ldots & x1219 & x1220 & \ldots & x12n9 \\ \vdots & \vdots & \vdots & \ddots & \vdots & \vdots & \ddots & \vdots \\ x1910 & x1911 & x1912 & \ldots & x1919 & x1920 & \ldots & x19n9 \\ x2010 & x2011 & x2012 & \ldots & x2019 & x2020 & \ldots & x20n9 \\ \vdots & \vdots & \vdots & \ddots & \vdots & \vdots & \ddots & \vdots \\ xn910 & xn911 & xn912 & \ldots & xn919 & xn920 & \ldots & xn9n9 \end{bmatrix} \qquad (13)$$

$$\begin{bmatrix} w10 \\ w11 \\ w12 \\ \vdots \\ w19 \\ w20 \\ \vdots \\ wn9 \end{bmatrix} = \begin{bmatrix} Y10 \\ Y11 \\ Y12 \\ \vdots \\ Y19 \\ Y20 \\ \vdots \\ Yn9 \end{bmatrix}$$

This equation (13) is a normal equation for computing the coefficient seed data. By solving this normal equation according to a general solution method, for example, a sweeping-out method (elimination method of Gauss-Jordan), coefficient seed data wi0-wi9 (i=1-n) can be obtained.

Figure 7:
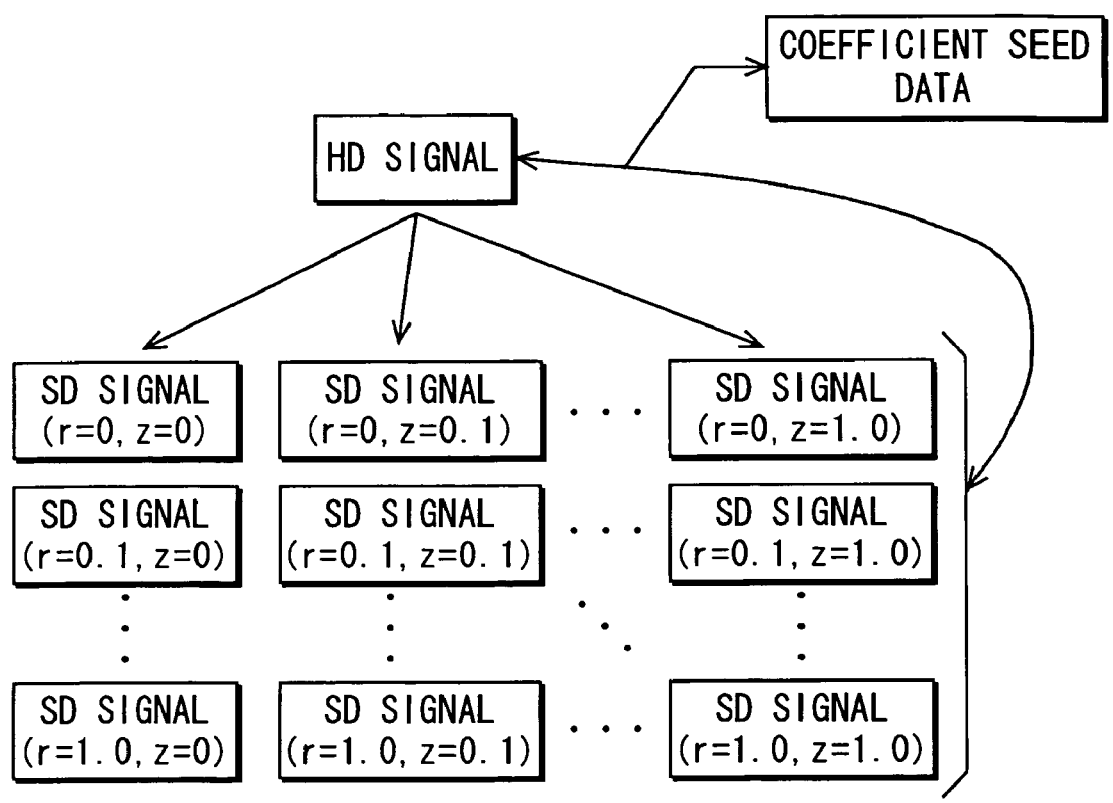
FIG. 7 is a diagram for explaining a generating method of coefficient seed data.

FIG. 7 shows a concept on the generating method of the above-described coefficient seed data. Plural SD signals as a student signal (first learning signal) are generated from the HD signal which is a teacher signal (second learning signal). In this case, changing frequency characteristic of a thinning filter used for generating the SD signal from the HD signal allows SD signals having different resolution to be generated.

The SD signals having the different resolution causes items of coefficient seed data having different effects of increasing the resolution to be generated. For example, if there are SD signals which secure an seriously dim image and SD signals which secure a less dim image, items of coefficient seed data having a strong effect of increasing the resolution are generated by learning with the SD signals which secure the seriously dim image while items of coefficient seed data having a weak effect of increasing the resolution are generated by learning with the SD signals which secure the less dim image.

Further, applying noise to the SD signals each having different resolution allows SD signals each having the noise to be generated. By changing an amount of the applied noise, the SD signals each having a different amount of the noise are generated. Consequently, items of coefficient seed data having a different noise-removing effect are generated. For example, if there are SD signals with much noise applied and SD signals with little noise applied, items of coefficient seed data having an excellent noise-removing effect are generated by learning with the SD signals having the much noise applied while items of coefficient seed data having a weak noise-removing effect are generated by learning with the SD signals with the little noise applied.

As regards an amount of noise to be applied, if a pixel value x' of the SD signal with noise applied is generated by applying noise n to a pixel value x of the SD signal, the amount of noise is adjusted by changing G according to the following equation (14):

$$x' = x + G \cdot n \qquad (14)$$

For example, a total kind of the SD signals of 121 are generated by changing a value of a parameter r for changing the frequency characteristic from 0 to 1 by 11 steps with 0.1 each and changing a value of a parameter z for changing the amount of noise to be applied from 0 to 1 by 11 steps with 0.1 each. Learning is carried out between the plural SD signals generated in this way and an HD signal, as shown in FIG. 7, so as to generate the coefficient seed data. These parameters r, z correspond to parameters r, z supplied to the coefficient-generating circuit 120 in the image-signal-processing section 104 shown in FIG. 1A.

Figure 8:
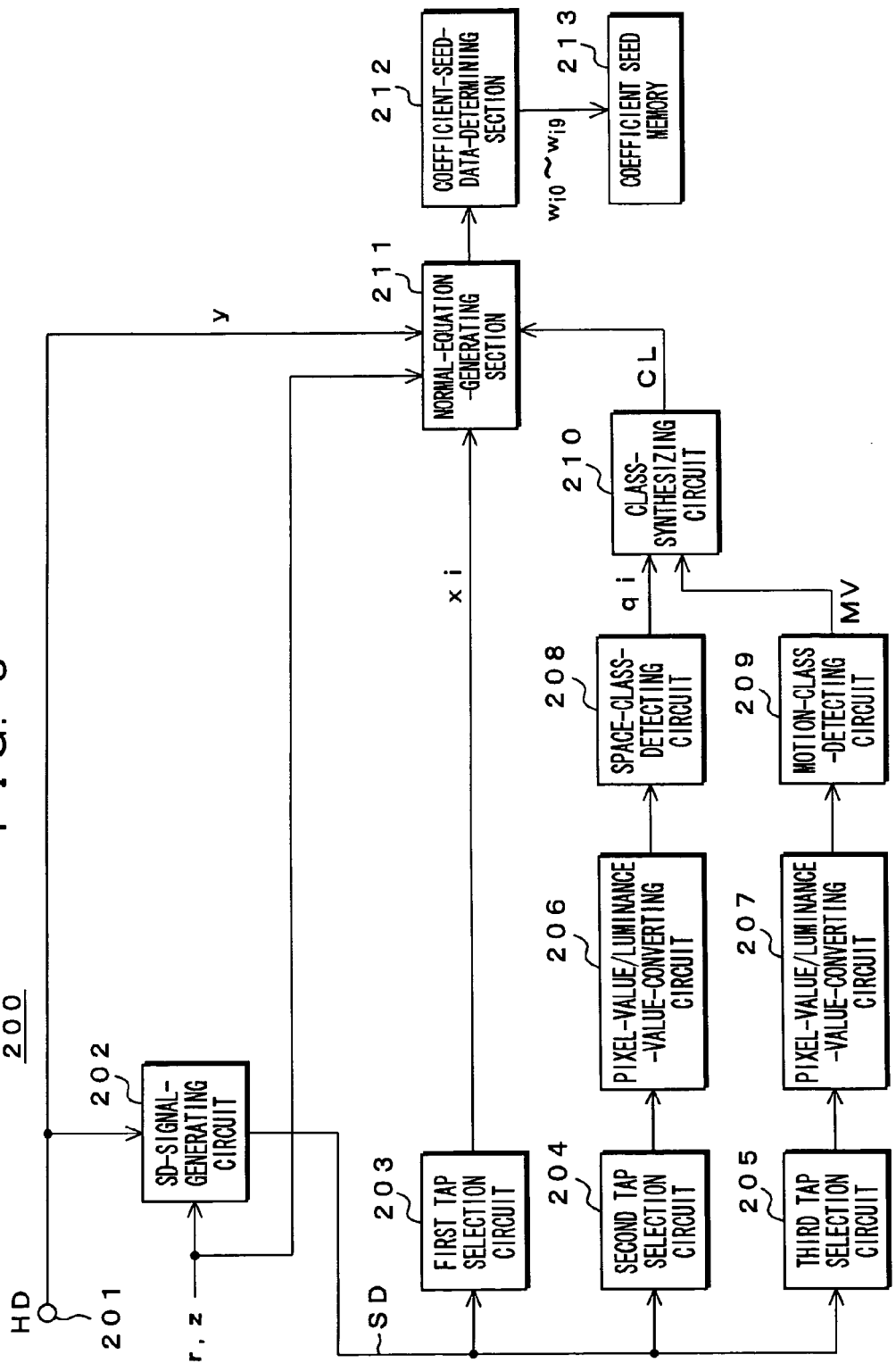
FIG. 8 is a block diagram showing a configuration of the coefficient-seed-data-generating unit.

Next, the following will describe a coefficient-seed-data-generating unit 200 for generating coefficient seed data wi0-wi9 (i=1-n) to be stored in the ROM 121 of the above-described image-signal-processing section 104. FIG. 8 shows a configuration of this coefficient-seed-data-generating unit 200.

This coefficient-seed-data-generating unit 200 comprises an input terminal 201 for inputting HD signal as a teacher signal and an SD-signal-generating circuit 202 for performing thinning-out processing on the HD signal horizontally and vertically to obtain SD signal as a student signal. The parameters r, z are supplied to the SD-signal-generating circuit 202. Corresponding to the value of the parameter r, a frequency characteristic of a thinning filter used for generating the SD signal from the HD signal is changed. Further, the amount of noise applied to the SD signal is changed corresponding to the value of the parameter z.

The coefficient-seed-data-generating unit 200 comprises first-third tap selection circuits 203-205 each for picking out multiple items of SD pixel data located around a target position in the HD signal selectively based on the SD signal output from the SD-signal-generating circuit 202 and for outputting them. These first-third tap selection circuits 203-205 are constituted in the same way as the first-third tap selection circuits 111-113 in the above-described image-signal-processing section 104. That is, the first tap selection circuit 203 picks out data of the prediction tap selectively, the second tap selection circuit 204 picks out data of the spatial class tap selectively, and the third tap selection circuit 205 picks out data of the motion class tap selectively.

The coefficient-seed-data-generating unit 200 has pixel-value/luminance-value-converting circuits 206, 207. The converting circuit 206 converts the values (pixel values) of the multiple items of SD pixel data as data of the spatial class tap, which have been selectively picked out in the second tap selection circuit 204, to luminance values based on the correspondence relation between a value of pixel data in the image display device 105 constituting the aforementioned TV receiver 100 and a luminance value as an output value.

The converting circuit 207 converts the values (pixel values) of the multiple items of SD pixel data as data the motion class tap, which have been selectively picked out by the third tap selection circuit 205, to luminance values based on the correspondence relation between a value of pixel data in the image display device 105 constituting the aforementioned TV receiver 100 and a luminance value as an output value.

These converting circuits 206, 207 are constituted in the same way as the converting circuits 114, 115 in the aforementioned image-signal-processing section 104. The converting circuit 206 constitutes a data-processing means for acquiring plural luminance values used for detection of the spatial class together with the second tap selection circuit 204. Likewise, the converting circuit 207 constitutes a data-processing means for acquiring plural luminance values used for the motion class detection together with the third tap selection circuit 205.

The coefficient-seed-data-generating unit 200 has a space-class-detecting circuit 208 for detecting a spatial class based on a level distribution pattern of the plural luminance values, which have been acquired in the converting circuit 206, corresponding to data of the spatial class tap and outputting the class information thereof. This space-class-detecting circuit 208 is constituted in the same way as the space-class-detecting circuit 116 in the aforementioned image-signal-processing section 104. This space-class-detecting circuit 208 then outputs requantization code qi of each of the luminance values as the class information indicating the spatial class.

The coefficient-seed-data-generating unit 200 has a motion-class-detecting circuit 209 for detecting a motion class for mainly indicating a degree of the motion based on the plural luminance values, which have been acquired by the converting circuit 207, corresponding to data of the motion class tap and outputting this class information MV. This motion-class-detecting circuit 209 is constituted in the same way as the motion-class-detecting circuit 117 in the aforementioned image-signal-processing section 104. This motion-class-detecting circuit 209 computes a frame differential from the plural luminance values, which have been selectively picked out by the third tap selection circuit 205, corresponding to data of the motion class tap and performs threshold processing on an average of the absolute values of that differentials so as to detect a motion class as the motion index.

The coefficient-seed-data-generating unit 200 has a class-synthesizing circuit 210 for acquiring a class code CL indicating a class to which pixel data of a target position in the HD signal (1050i signal) belongs based on the requantization code qi, which has been outputted from the space-class-detecting circuit 208, as the class information of the spatial class and the class information MV of motion class outputted by the motion-class-detecting circuit 209. This class-synthesizing circuit 210 is constituted in the same way as the class-synthesizing circuit 118 in the aforementioned image-signal-processing section 104.

The coefficient-seed-data-generating unit 200 has a normal-equation-generating section 211. This normal-equation-generating section 211 generates a normal equation (see equation (13)) for acquiring the coefficient seed data $w_{i0}$-$w_{i9}$ (i=1–n) of each class for each combination of the classes and output pixels based on each HD pixel data y as pixel data of target position obtained from the HD signal supplied to the input terminal 201, data xi of the prediction tap picked out selectively by the first tap selection circuit 203 corresponding to each HD pixel data y, the class code CL obtained by the class-synthesizing circuit 210 corresponding to each HD pixel data y, and the values of the parameters r, z.

Learning data is generated by combination between an item of the HD pixel data y and the data xi of the prediction tap (multiple items of SD pixel data) corresponding thereto, and a large number of items of the learning data is generated for each class between the HD signal as the teacher signal and the SD signals as the student signals. Consequently, the normal-equation-generating section 211 generates a normal equation for acquiring the coefficient seed data $w_{i0}$-$w_{i9}$ (i=1—n) for each class.

In this case, the normal-equation-generating section 211 generates a normal equation for each of the output pixels (see HD1-HD4 in FIG. 5 and HD1'-HD4' in FIG. 6). For example, a normal equation corresponding to HD1 is generated from learning data constituted of HD pixel data y whose deviation value to the central prediction tap is in the same relation as HD1. As a result, the normal-equation-generating section 211 generates the normal equation for each of the combinations between the class and the output pixel.

The coefficient-seed-data-generating unit 200 comprises a coefficient-seed-data-determining section 212 and a coefficient seed memory 213. The coefficient-seed-data-determining section 212 receives data about the normal equation from the normal-equation-generating section 211, solves that normal equation according to sweep-out method or the like, and obtains the coefficient seed data $w_{i0}$-$w_{i9}$ for each of the combinations between the class and the output pixel. The coefficient seed memory 213 stores the coefficient seed data $w_{i0}$-$w_{i9}$ obtained by the coefficient-seed-data-determining section 212.

The following will describe operations of the coefficient-seed-data-generating unit 200 shown in FIG. 8.

Horizontal and vertical thinning-out processing is performed on the HD signal input to the input terminal 201 by the SD-signal-generating circuit 202 to generate an SD signal. In this case, the parameters r, z are supplied to the SD-signal-generating circuit 202 as control signals, thereby sequentially generating plural SD signals whose frequency characteristic and the amount of applied noise change step by step.

The data of the spatial class tap located around a target position in the HD signal is selectively picked out in the second tap selection circuit 204 from the SD signals obtained by the SD-signal-generating circuit 202. The multiple items of SD pixel data are supplied to the pixel-value/luminance-value-converting circuit 206 as data of this spatial class tap.

In the converting circuit 206, the values (pixel values) of the multiple items of SD pixel data are converted to luminance values based on the correspondence relation between a value (pixel value) of the pixel data in the image display device 105 (see FIG. 1A) in the TV receiver 100 and a luminance value. The plural luminance values obtained by this conversion are supplied to the space-class-detecting circuit 208. This space-class-detecting circuit 208 executes the ADRC processing on each luminance value so as to obtain the requantization code qi (see the equation (2)) as the class information of the spatial class (classification of class for mainly expressing the waveform in the space).

In the third tap selection circuit 205, data of the motion class tap located around a target position in the HD signal is selectively picked out from the SD signal obtained by the SD-signal-generating circuit 202. The multiple items of SD pixel data as data of this motion class tap are supplied to the pixel-value/luminance-value-converting circuit 207.

In the converting circuit 207, the values (pixel values) of the multiple items of SD pixel data are converted to luminance values based on the correspondence relation between a value (pixel value) of pixel data in the image display device 105 (see FIG. 1A) in the TV receiver 100 and a luminance value. The plural luminance values obtained by this conversion are supplied to the motion-class-detecting circuit 209. This motion-class-detecting circuit 209 obtains class information MV of the motion class (classification of class for mainly expressing a degree of the motion) from the plural luminance values.

This class information MV and the aforementioned requantization code qi are supplied to the class-synthesizing circuit 210. This class-synthesizing circuit 210 obtains a class code CL (see the equation (4)) indicating a class to which the pixel data of the target position in the HD signal (1050i signal) belongs from the class information MV and the requantization code qi.

In the first tap selection circuit 203, the data xi of the prediction tap located around a target position in the HD signal is selectively picked out from the SD signal obtained by the SD-signal-generating circuit 202.

In the normal-equation-generating section 211, a normal equation (see the equation (13)) for generating the coefficient seed data wi0-wi9 (i=1–n) is generated for each combination of the class and output pixel based on each HD pixel data y as the pixel data of the target position obtained from the HD signal supplied to the input terminal 201, the data xi of the prediction tap picked out selectively by the first tap selection circuit 203 corresponding to each HD pixel data y, the class code CL outputted from the class-synthesizing circuit 210 corresponding to each HD pixel data y, and the values of the parameters r, z. The coefficient seed data wi0-wi9 is obtained by solving each normal equation in the coefficient-seed-data-determining section 212. The coefficient seed data wi0-wi9 is then stored in the coefficient seed memory 213.

In the coefficient-seed-data-generating unit 200 shown in FIG. 8, the values of the multiple items of pixel data of the student signal (525i signal) located around a target position in the teacher signal (1050i signal) are converted to plural luminance values based on the correspondence relation between a value of pixel data in the image display device 105 for obtaining an image by the HD signal and a luminance value as an output value. Based on the plural luminance values, a class to which the informational data of the target position in the teacher signal belongs is detected, thereby obtaining the coefficient seed data for each class. Thus, in the coefficient-seed-data-generating unit 200, the coefficient seed data wi0-wi9 (i=1–n) for each combination of the classes and the output pixels is generated preferably. The coefficient seed data is then stored in the ROM 121 of the image-signal-processing section 104 shown in FIG. 1A.

Although in the coefficient-seed-data-generating unit 200 shown in FIG. 8, the frequency characteristic of the thinning-out filter and the amount of noise, to be applied, when the SD signal is generated have been changed with the values of parameters r, z, it is permissible to fix the SD signal and change the frequency characteristic of the HD signal and an amount of noise to be applied.

Figure 9:
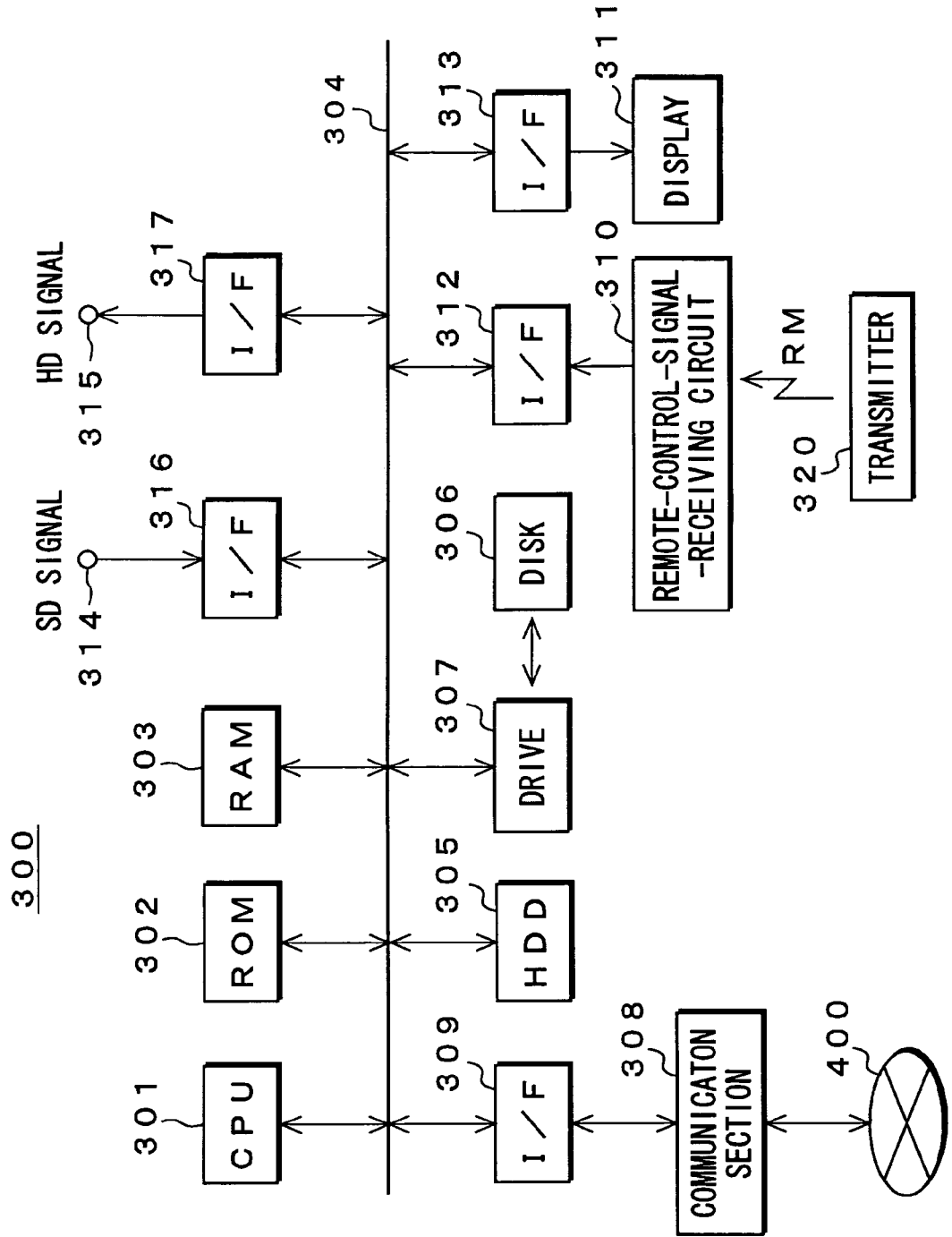
FIG. 9 is a block diagram showing a configuration of the image-signal-processing apparatus, which is achieved with software.

The processing in the image-signal-processing section 104 shown in FIG. 1A may be achieved with software by, for example, an image-signal-processing apparatus 300 shown in FIG. 9. First, the following will describe the image-signal-processing apparatus 300 shown in FIG. 9. This image-signal-processing apparatus 300 comprises a CPU 301 for controlling the operations of the entire system, a read only memory (ROM) 302 for storing operation program of the CPU 301, coefficient seed data and the like, and a random access memory (RAM) 303 for constituting a working area of the CPU 301. The CPU 301, the ROM 302, and the RAM 303 are connected through a bus 304.

The image-signal-processing apparatus 300 has a hard disk drive (HDD) 305 as an external memory unit and a drive 307 for driving a removable disk 306. These drives 305, 307 are connected through the bus 304.

The image signal processing apparatus 300 has a communication section 308 for communicating with a communication network 400 such as Internet by wire or by radio. This communication section 308 is connected to the bus 304 through the interface 309.

The image signal processing apparatus 300 has a user interface section. This user interface section comprises a remote-control-signal-receiving circuit 310 for receiving a remote control signal RM from the remote control transmitter 320 and a display 311 composed of liquid crystal display (LCD) and the like. The receiving circuit 310 is connected to the bus 304 through an interface 312, and the display 311 is connected to the bus 304 through an interface 313.

The image signal processing apparatus 300 comprises an input terminal 314 for inputting the SD signal and an output terminal 315 for outputting the HD signal. The input terminal 314 is connected to the bus 304 through an interface 316, and the output terminal 315 is connected to the bus 304 through an interface 317.

The processing programs, coefficient seed data and the like may be downloaded from a communication network 400 such as Internet through the communication section 308 and accumulated in the HDD 305, the RAM 303 and the like instead of storing them preliminarily in the ROM 302 as described above. Further, these processing programs, coefficient seed data and the like may be provided in the form of a disk 306.

The SD signal to be processed may be recorded in the HDD 305 preliminarily or downloaded from there by the communication section 308 through a communication network 400 such as Internet instead of inputting the SD signal to be processed through the input terminal 314. Further, instead of outputting the HD signal after a processing from the output terminal 315, or together with that, that HD signal after the processing may be supplied to the display 311 for displaying it on a screen thereof, stored in the HDD 305, or transmitted to the communication network 400 through the communication section 308.

Figure 10:
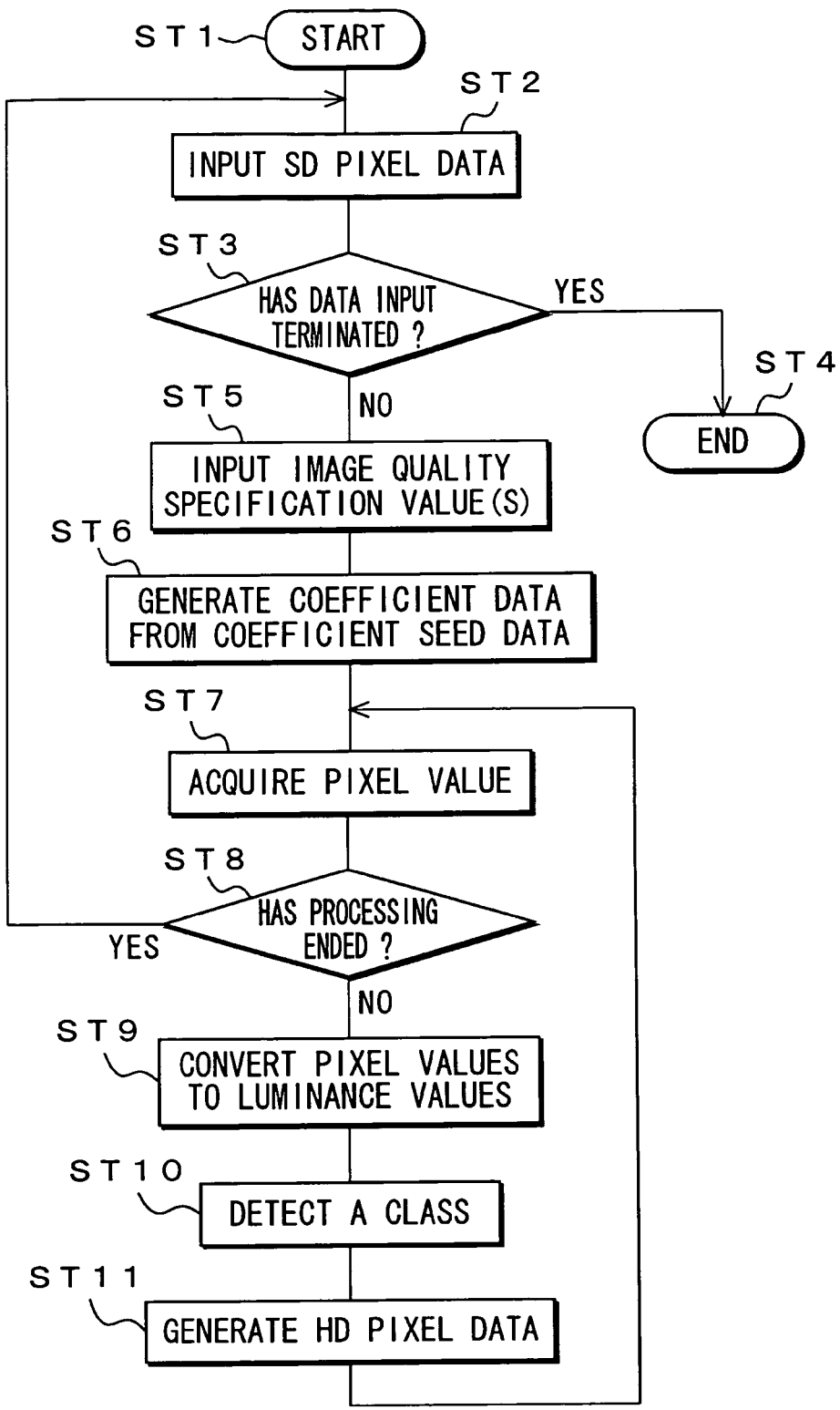
FIG. 10 is a flow chart showing the procedure of the image signal processing.

By referring to a flow chart shown in FIG. 10, the following will describe the processing procedure for obtaining the HD signal from the SD signal in the image-signal-processing apparatus 300 shown in FIG. 9.

First, in step ST1, the procedure starts and in step ST2, SD pixel data by a single frame or a single field is input. If this SD pixel data is input through the input terminal 314, this SD pixel data is stored temporarily in the RAM 303. If this SD pixel data is recorded in the HDD 305, this SD pixel is read out of the HDD 305 and stored in the RAM 303 temporarily.

Then, in step ST3, it is determined whether or not processing of all frames or all fields for the SD pixel data is terminated. If that processing is terminated, the procedure ends in step ST4. On the other hand, unless the processing is terminated, the procedure proceeds to step ST5.

In step ST5, image quality specification value(s) (values of the parameters r, z in this case) input by user's operation of the remote control transmitter 320 is (are) read out of, for example, the RAM 303. Then, in step ST6, the coefficient data Wi of each class is generated according to a generation equation (see the equation (5)) using the values of the parameters r, z read in step ST5 and the coefficient seed data of each class stored in the ROM 202.

Next, in step ST7, multiple items of SD pixel data are obtained from the SD pixel data of a single field or a single frame input in step ST2, as data of the class tap and the prediction tap, with them corresponding to the target position of the HD signal. In step ST8, it is determined whether or not the processing for obtaining the HD pixel data in an entire region of the SD pixel data input in step ST2 ends. If it ends, the procedure returns to step ST2, in which input processing of the SD pixel data of a next single frame or a single field is executed. On the other hand, unless the processing ends, the procedure proceeds to step ST9.

In this step ST9, values (pixel values) of the multiple items of SD pixel data as data of the class tap acquired in step ST7 are respectively converted to luminance values based on the correspondence relation between a value of the pixel data in an image display device for displaying an image of the HD signal and a luminance value as an output value. This correspondence relation is supplied by, for example, the removable disk 306 and held in the HDD 305. Consequently, when the kind of the image display device is changed, this correspondence relation can be immediately changed.

In step ST10, compression processing such as the ADRC is executed on the plural luminance values corresponding to data of the class tap obtained by the conversion in step ST9 so as to generate a class code CL indicating a class to which the pixel data of a target position in the HD signal belongs. Then, in step ST11, the pixel data of the target position in the HD signal is generated according to the estimation equation (see the equation (6)) using the coefficient data Wi of the class indicated by the class code CL generated in step ST10, which are of the coefficient data Wi of respective classes generated in step ST6, and data xi of the prediction tap obtained in step ST7. After that, the procedure returns to step ST7, in which processing on a next target position of the HD signal is executed.

Thus, executing the processing procedure along the flow chart shown in FIG. 10 by processing the SD pixel data which constitutes the input SD signal allows to be obtained the HD pixel data which constitutes the HD signal. As described above, the HD signal obtained in this way is output through the output terminal 315 or supplied to the display 311 and displayed as an image or recorded in the HDD 305.

The processing in the coefficient-seed-data-generating unit 200 shown in FIG. 8 can be realized with software although representation of its processing unit is omitted.

Figure 11:
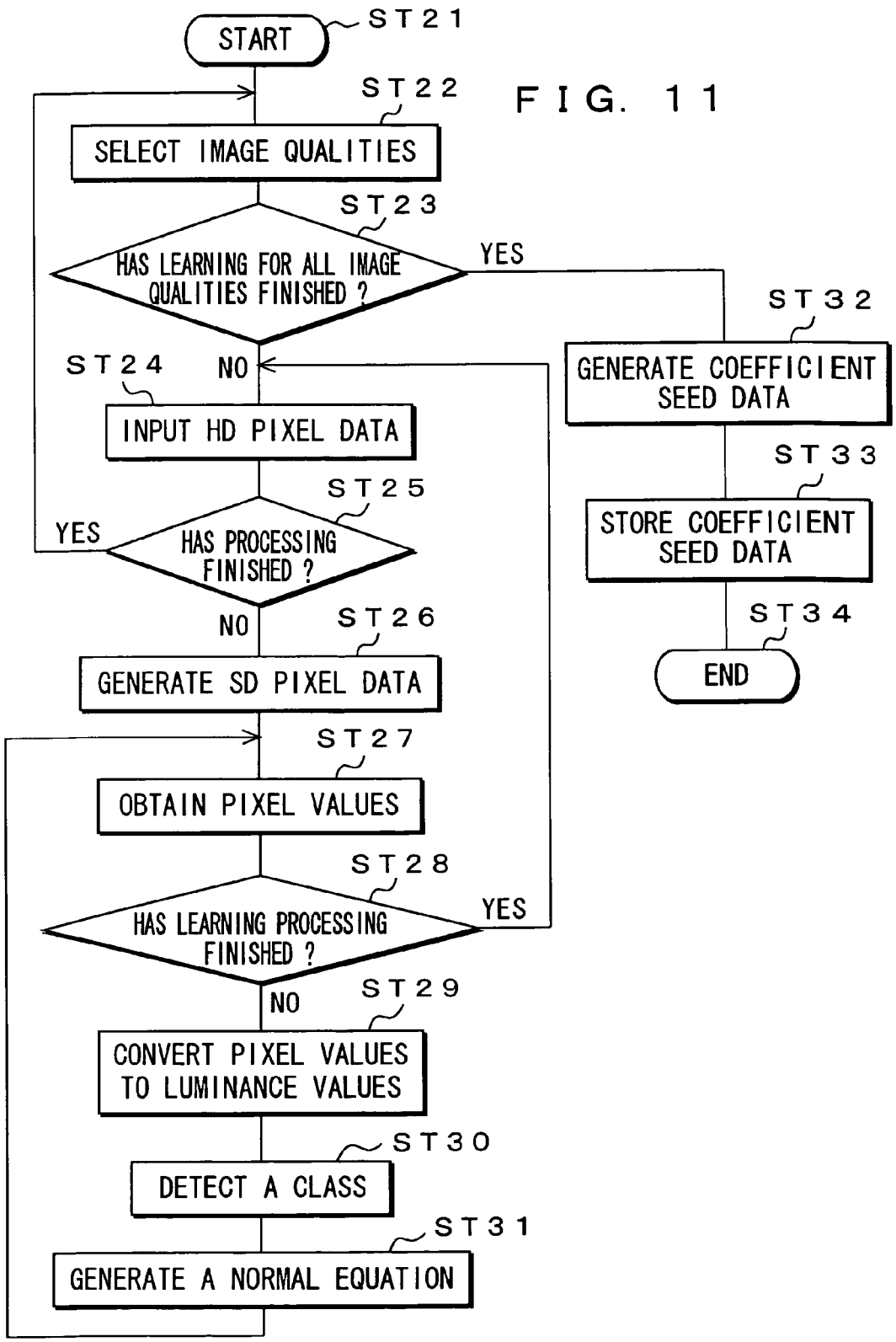
FIG. 11 is a flow chart showing the procedure of coefficient seed data generating processing.

The following will describe the processing procedure for generating coefficient seed data with reference to the flow chart of FIG. 11.

First, in step ST21, the procedure starts and in step ST22, image quality patterns (specified by the values of the parameters r, z) to be used for learning are selected. In step ST23, it is determined whether or not learning is finished for all image quality patterns. Unless any learning is finished for all image quality patterns, the procedure proceeds to step ST24.

In this step ST24, known HD pixel data by a single frame or a single field is input. Then, in step ST25, it is determined whether or not the processing for the HD pixel data of all frames or all fields is finished. If it is finished, the procedure returns to step ST22, in which a next image quality pattern is selected and the same processing as described above is repeated. On the other hand, unless it is finished, the procedure proceeds to step ST26.

In this step ST26, SD pixel data is generated based on the image quality patterns selected in step ST22 according to the HD pixel data input in step ST24. In step ST27, multiple items of SD pixel data are obtained as data of the class tap and the prediction tap corresponding to the target position of the HD signal from the SD pixel data generated in step ST26.

In step ST28, it is determined whether or not learning processing is finished in all regions of generated SD pixel data. If the learning processing is finished, the procedure returns to step ST24, in which the HD pixel data of a next frame or field is input and the same processing as described above is repeated. On the other hand, unless any learning processing is finished, the procedure proceeds to step ST29.

In this step ST29, the values (pixel values) of the multiple items of SD pixel data as data of the class tap obtained in step ST27 are converted to luminance values based on the correspondence relation between a value of the pixel data in the image display device (for example, image display device 105 shown in FIG. 1A) for displaying an image of the HD signal and a luminance value as an output value.

Next, in step ST30, a class code CL indicating the class to which the pixel data of the target position in the HD signal belongs is generated based on the plural luminance values corresponding to data of the class tap.

In step ST31, addition of a normal equation (see the equation (13)) of the class indicated by the class code CL is carried out based on the HD pixel data of the target position in the HD signal, which is of the HD pixel data of a single frame or a single field input in step ST24, the multiple items of SD pixel data as data of the prediction tap obtained in step ST29, the values of the parameters r, z which specify the image quality pattern in step ST22, and the class code CL generated in step ST30. After that, the procedure returns to step ST27, in which a processing of a next target position in the HD signal is executed.

When learning for all image quality patterns is finished in step ST23, the procedure proceeds to step ST32. In this step ST32, the coefficient seed data wi0-wi9 of each class is computed by solving the normal equation of each class according to sweep-out method or the like. Then, the coefficient seed data wi0-wi9 is stored in the memory in step ST33 and then, the procedure terminates in step ST34.

Thus, executing a processing following the flow chart shown in FIG. 11 allows the coefficient seed data wi0-wi9 to be obtained according to the same method as in the coefficient-seed-data-generating unit 200 shown in FIG. 8.

According to the above-described embodiments, the multiple items of SD pixel data located around a target position in the HD signal have been selectively picked out based on the SD signal in the tap selection circuits 112, 113 and after that, the pixel-value/luminance-value-converting circuits 114, 115 have converted the values of the multiple items of SD pixel data to the luminance values. However, conversely it is permissible also to convert the values of respective items of the SD pixel data which constitute the SD signal to the luminance values and after that, pick out plural luminance values corresponding to the multiple items of SD pixel data located around the target position in the HD signal based on the respective luminance values obtained by this conversion. This is the same for the tap selection circuits 204, 205 and the pixel-value/luminance-value-converting circuits 206, 207 in the coefficient-seed-data-generating unit 200.

According to the above-described embodiments, the coefficient seed data wi0-wi9, which is the coefficient data in a generation equation for generating the coefficient data Wi, is stored in the ROM 121 of the image-signal-processing section 104. In the coefficient-generating circuit 120, the coefficient data Wi of each class corresponding to the parameters r, z adjusted by user's operation is generated using this coefficient seed data wi0-wi9 and stored in the coefficient memory 119, so as to save the memory.

However, it can be considered to store the coefficient data Wi itself corresponding to each combination of the classes and the values of the parameters r, z in the ROM 121, for example. In this case, in the image-signal-processing section 104, the coefficient data Wi corresponding to the class indicated by the class code CL obtained by the class-synthesizing circuit 118 and the values of the parameters r, z adjusted by user's operation is read out of the ROM 121 and supplied to the estimation/prediction-operating circuit 122. By storing the coefficient data Wi in the ROM 121, labor and time for computation can be saved.

According to the above-described embodiments, the coefficient data Wi of each class corresponding to the values of the parameters r, z adjusted by user's operation has been generated in the coefficient-generating circuit 120 and stored in the coefficient memory 119. However, the present invention can be applied to a type having no coefficient-generating circuit 120 or ROM 121 and having such a configuration that the coefficient data Wi of each class is stored preliminarily in the coefficient memory 119.

Although the above-described embodiments have paid attention to the parameter r for determining the resolution and parameter z for determining the noise removal degree, the parameters for determining the quality of an image by the HD signal are not restricted to these parameters r, z. The quantity of the parameters is not restricted to two, but may be one or three. For example, in case where three parameters are available, in addition to the parameter z for determining the noise removal degree, the parameter h for determining the resolution in the horizontal direction and the parameter v for determining the resolution in the vertical direction are available.

Although the above-described embodiments have indicated a case where the informational signal is an image signal, the present invention is not restricted to this example. For example, even when the informational signal is an audio signal, the present invention can be applied also thereto.

Thus have been described an apparatus for processing informational signal and the like wherein the first informational signal is converted to the second informational signal by classification adaptive processing and by executing classification appropriate to the output characteristic of an output means which outputs the second informational signal, the second informational signal adaptive to the output means is obtained. For example, the present invention can be applied to an application for obtaining the HD signal from the SD signal by the classification adaptive processing.

According to the present invention, values of the multiple items of informational data of the first informational signal located around a target position in the second informational signal are converted to plural output values based on the correspondence relation between a value of the informational data in the output means for obtaining an output according to the second informational signal and an output value, and a class to which the informational data of the target position in the second informational signal belongs is detected based on the plural output values so as to generate informational data of the target position in the second informational signal corresponding to this class. Consequently, appropriate classification of class to the output characteristic of the output means can be achieved so that the second informational signal adaptive to the output means can be obtained.

The present application contains subject matter related to Japanese patent application No.P2003-375934, filed in Japanese Patent Office on Nov. 5, 2003, the entire contents of which being incorporated herein by reference.

While the foregoing specification has described preferred embodiment(s) of the present invention, one skilled in the art may make many modifications to the preferred embodiment without departing from the invention in its broader aspects. The appended claims therefore are intended to cover all such modifications as fall within the true scope and spirit of the invention.

What is claimed is:

1. An apparatus for processing informational signal wherein a first informational signal including multiple items of informational data is converted to a second informational signal including multiple items of informational data, said apparatus comprising:

data-processing means for converting values of the multiple items of the informational data of said first informational signal located around a target position in said second informational signal based on a correspondence relation between a value of informational data in output means for obtaining an output by said second informational signal and an output value to obtain plural output values;

class-detecting means for detecting a class to which the informational data of the target position in said second informational signal belongs based on the plural output values obtained by said data-processing means; and informational-data-generating means for generating the informational data of the target position in said second informational signal based on said first informational signal corresponding to the class detected by said class-detecting means.

2. The apparatus for processing informational signal according to claim 1 wherein said data-processing means includes data-selecting means for selecting multiple items of informational data located around the target position in said second informational signal based on said first informational signal, and pixel value/output value converting means for converting the multiple items of informational data selected by said data-selecting means to each output value based on the correspondence relation between the value of said informational data and the output value to acquire said plural output values.

3. The apparatus for processing informational signal according to claim 1 wherein said data-processing means includes pixel value/output value-converting means for converting the value of each informational data constituting said first informational signal to each output value based on the correspondence relation between the value of the informational data and the output value, and data-selecting means for selecting and picking out the plural output values corresponding to the multiple items of the informational data of said first informational signal located around the target position in said second informational signal based on each output value obtained by conversion with said pixel value/output value-converting means, said output value corresponding to each informational data constituting said first informational signal, to obtain said plural output values.

4. The apparatus for processing informational signal according to claim 1 wherein said informational signal includes an image signal and the correspondence relation between said informational data value and the output value includes a correspondence relation between the value of pixel data and a luminance value.

5. The apparatus for processing informational signal according to claim 1 wherein said informational-data-generating means includes coefficient-data-generating means for generating coefficient data used for an estimation equation, said coefficient data corresponding to a class detected by said class-detecting means, data-selecting means for selecting multiple items of informational data located around the target position in said second informational signal based on said first informational signal, and computing means for computing the informational data of the target position in said second informational signal based on said estimation equation using the multiple items of informational data selected by said data-selecting means and the coefficient data generated by said coefficient-data-generating means.

6. The apparatus for processing informational signal according to claim 5 further comprising parameter-inputting means for inputting a value of a parameter indicating a quality of output by said second informational signal, wherein said coefficient-data-generating means generates the coefficient data used for the estimation equation, said coefficient data corresponding to the class detected by said class-detecting means and the value of the parameter input by said parameter-inputting means.

7. The apparatus for processing informational signal according to claim 6 wherein said coefficient-data-generating means includes storing means for storing coefficient seed data for every class, said coefficient seed data being coefficient data of a generation equation containing said parameter, said generation equation generating the coefficient data used for said estimation equation, and wherein said coefficient-data-generating means generates coefficient data based on said generation equation as coefficient data used for said estimation equation using the coefficient seed data of the class detected by said class-detecting means, said coefficient seed data being stored in said memory means, and the value of the parameter input by said parameter-inputting means.

8. An apparatus for processing informational signal wherein a first informational signal including multiple items of informational data is converted to a second informational signal including multiple items of informational data, said apparatus comprising:

a data-processing unit configured to convert values of the multiple items of the informational data of said first informational signal located around a target position in said second informational signal based on a correspondence relation between a value of informational data in an output unit for obtaining an output by said second informational signal and an output value to obtain plural output values;

a class-detecting unit configured to detect a class to which the informational data of the target position in said second informational signal belongs based on the plural output values obtained by said data-processing unit; and an informational-data-generating unit configured to generate informational data of the target position in said second informational signal based on said first informational signal corresponding to the class detected by said class-detecting unit.

9. A method for processing informational signal wherein a first informational signal including multiple items of informational data is converted to a second informational signal including multiple items of informational data, said method comprising the steps of:

converting values of the multiple items of informational data of said first informational signal located around a target position in said second informational signal based on a correspondence relation between a value of informational data in an output means for obtaining an output by said second informational signal and an output value to obtain plural output values;

detecting a class to which the informational data of the target position in said second informational signal belongs based on the plural output values obtained by said output-values-obtaining step; and generating the informational data of the target position in said second informational signal based on said first informational signal corresponding to the class detected by said class-detecting step.

10. A computer readable medium configured to store a program for converting a first informational signal including multiple items of informational data to a second informational signal including multiple items of informational data, said program including computer instructions, which when executed by a computer cause the computer to perform steps comprising:

converting values of the multiple items of informational data of said first informational signal located around a target position in said second informational signal based on a correspondence relation between a value of informational data in an output means for obtaining an output by said second informational signal and an output value to obtain plural output values;

detecting a class to which the informational data of the target position in said second informational signal belongs based on the plural output values obtained by said output-values-obtaining step; and generating the informational data of the target position in said second informational signal based on said first informational signal corresponding to the class detected by said class-detecting step.

11. An apparatus for generating coefficient seed data that is coefficient data in a generation equation for generating coefficient data used for an estimation equation for use when converting first informational signal composed of multiple items of informational data to second informational signal composed of multiple items of informational data, said apparatus comprising:

parameter-inputting means for inputting a value of a parameter for specifying a quality of output by any one of a first learning signal corresponding to said first informational signal and a second learning signal corresponding to said second informational signal with the quality of output corresponding to a parameter contained in said generation equation;

data-processing means for converting values of the multiple items of informational data of said first learning signal located around a target position in said second learning signal based on correspondence relation between a value of informational data in output means for obtaining an output by said second informational signal and an output value to obtain plural output values;

class-detecting means for detecting a class to which the informational data of the target position in said second learning signal belongs based on the plural output values obtained by said data-processing means;

data-selecting means for selecting the multiple items of informational data located around the target position in said second learning signal based on said first learning signal; and arithmetic operating means for operating and obtaining said coefficient seed data for each class using a class detected by said class-detecting means, the value of the parameter input by said parameter-inputting means, the multiple items of informational data selected by said data-selecting means, and the informational data of the target position in said second learning signal.

12. An apparatus for generating coefficient seed data that is coefficient data in a generation equation for generating coefficient data used for an estimation equation for use when converting first informational signal composed of multiple items of informational data to second informational signal composed of multiple items of informational data, said apparatus comprising:

a parameter-inputting unit configured to input a value of a parameter for specifying a quality of output by any one of a first learning signal corresponding to said first informational signal and a second learning signal corresponding to said second informational signal with the quality of output corresponding to a parameter contained in said generation equation;

a data-processing unit configured to convert values of the multiple items of informational data of said first learning signal located around a target position in said second learning signal based on correspondence relation between a value of informational data in an output unit for obtaining an output by said second informational signal and an output value to obtain plural output values;

a class-detecting unit configured to detect a class to which the informational data of the target position in said second learning signal belongs based on the plural output values obtained by said data-processing unit;

a data-selecting unit configured to select the multiple items of informational data located around the target position in said second learning signal based on said first learning signal; and an arithmetic operating unit configured to operate and obtain said coefficient seed data for each class using a class detected by said class-detecting unit, the value of the parameter input by said parameter-inputting unit, the multiple items of informational data selected by said data-selecting unit, and the informational data of the target position in said second learning signal.

13. A method for generating coefficient seed data that is coefficient data in a generation equation for generating coefficient data used for an estimation equation for use when converting first informational signal composed of multiple items of informational data to second informational signal composed of multiple items of informational data, said method comprising the steps of:

inputting a value of a parameter for specifying a quality of output by any one of a first learning signal corresponding to said first informational signal and a second learning signal corresponding to said second informational signal with the quality of output corresponding to a parameter contained in said generation equation;

converting values of the multiple items of informational data of said first learning signal located around a target position in said second learning signal based on correspondence relation between a value of informational data in an output means for obtaining an output by said second informational signal and an output value to obtain plural output values;

detecting a class to which the informational data of the target position in said second learning signal belongs based on the multiple items of output values obtained by said output-values-obtaining step;

selecting the multiple items of informational data located around the target position in said second learning signal based on said first learning signal; and operating and obtaining said coefficient seed data for each class using a class detected by said class-detecting step, the value of the parameter input in said parameter-value-inputting step, the multiple items of informational data selected in said data-selecting step, and the informational data of the target position in said second learning signal.

14. A computer readable medium recording a program for allowing a computer to execute a method for generating coefficient seed data that is coefficient data in a generation equation for generating coefficient data used for an estimation equation for use when converting first informational signal composed of multiple items of informational data to second informational signal composed of multiple items of informational data, said program including computer instructions, which when executed by a computer cause the computer to perform steps comprising:

inputting a value of a parameter for specifying a quality of output by any one of a first learning signal corresponding to said first informational signal and a second learning signal corresponding to said second informational signal with the quality of output corresponding to a parameter contained in said generation equation;

converting values of the multiple items of informational data of said first learning signal located around a target position in said second learning signal based on correspondence relation between a value of informational data in an output means for obtaining an output by said second informational signal and an output value to obtain plural output values;

detecting a class to which the informational data of the target position in said second learning signal belongs based on the multiple items of output values obtained by said output-values-obtaining step;

selecting the multiple items of informational data located around the target position in said second learning signal based on said first learning signal; and operating and obtaining said coefficient seed data for each class using a class detected by said class-detecting step, the value of the parameter input in said parameter-value-inputting step, the multiple items of informational data selected in said data-selecting step, and the informational data of the target position in said second learning signal.

* * * * *